United States Patent
Oh

(10) Patent No.: US 12,418,928 B2
(45) Date of Patent: Sep. 16, 2025

(54) METHOD AND APPARATUS FOR ALIGNING BEAM AND TRACKING BEAM IN SIDELINK COMMUNICATION

(71) Applicant: LG ELECTRONICS INC., Seoul (KR)

(72) Inventor: Jong Ok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/922,939

(22) PCT Filed: May 7, 2021

(86) PCT No.: PCT/KR2021/005750
§ 371 (c)(1),
(2) Date: Nov. 2, 2022

(87) PCT Pub. No.: WO2021/225413
PCT Pub. Date: Nov. 11, 2021

(65) Prior Publication Data
US 2023/0354385 A1    Nov. 2, 2023

(30) Foreign Application Priority Data

May 8, 2020 (KR) .................. 10-2020-0055259
Oct. 23, 2020 (KR) .................. 10-2020-0138434

(51) Int. Cl.
*H04W 72/40* (2023.01)
*H04W 72/044* (2023.01)
*H04W 72/542* (2023.01)

(52) U.S. Cl.
CPC ......... *H04W 72/40* (2023.01); *H04W 72/046* (2013.01); *H04W 72/542* (2023.01)

(58) Field of Classification Search
CPC . H04W 72/40; H04W 72/542; H04W 72/046; H04W 72/543; H04W 16/28;
(Continued)

(56) References Cited

U.S. PATENT DOCUMENTS

2020/0045664 A1* 2/2020 Choi ................. H04W 4/40
2021/0329598 A1* 10/2021 Wang ................ H04W 4/40
(Continued)

FOREIGN PATENT DOCUMENTS

| WO | 2019/036578 A1 | 2/2019 | |
|---|---|---|---|
| WO | WO-2020033086 A1 * | 2/2020 | ............ G08G 1/22 |
| WO | WO-2020068906 A1 * | 4/2020 | .......... H04W 72/046 |

OTHER PUBLICATIONS

R1-1902274, 3GPP TSG RAN WG1 #96, Athens, Greece, Feb. 25-Mar. 1, 2019, Agenda item: 7.2.4.1.2, Source: Samsung, Title: On Physical Layer Procedures for NR V2X, Document for: Discussion and Decision (15 pages).

*Primary Examiner* — Mewale A Ambaye
(74) *Attorney, Agent, or Firm* — BRYAN CAVE LEIGHTON PAISNER LLP

(57) ABSTRACT a method of operating a reception terminal based on a beam in a wireless communication system may be provided. The method may include the reception terminal receiving at least one sidelink synchronization signal/broadcast block (S-SSB) from a transmission terminal, selecting a best beam based on the at least one S-SSB, transmitting a best beam indication signal indicating the selected best beam to the transmission terminal, and performing a link connection with the transmission terminal based on the best beam. Each of the at least one S-SSB may be associated with each beam index based on a beam direction, each beam index may be associated with each sequence offset, and the best beam
(Continued)

indication signal may be generated based on a sequence offset corresponding to the best beam.

17 Claims, 25 Drawing Sheets

(58) Field of Classification Search
CPC ....... H04W 4/40; H04B 7/088; H04B 7/0695; H04B 7/0639
See application file for complete search history.

(56) References Cited

U.S. PATENT DOCUMENTS

| | | |
|---|---|---|
| 2022/0070805 A1* | 3/2022 | Ohara .................... H04W 48/08 |
| 2022/0353833 A1* | 11/2022 | Chae .................... H04W 56/002 |
| 2023/0184870 A1* | 6/2023 | Shuman ................ G01S 5/0036 |
| | | 455/456.1 |
| 2023/0276346 A1* | 8/2023 | Kim ........................ H04W 4/40 |

* cited by examiner

METHOD AND APPARATUS FOR ALIGNING BEAM AND TRACKING BEAM IN SIDELINK COMMUNICATION

CROSS-REFERENCE TO RELATED APPLICATIONS

This application is a National Stage Filing Under 35 U.S.C. 371 of International Application No. PCT/KR2021/005750, filed on May 7, 2021, which claims the benefit of earlier filing date and right of priority to Korean Application No. 10-2020-0055259, filed on May 8, 2020, Korean Application No. 10-2020-0138434, filed on Oct. 23, 2020, the contents of which are all hereby incorporated by reference herein in their entirety.

CROSS REFERENCE TO RELATED APPLICATION

The present application claims priority to a KR application 10-2020-0055259, filed May 8, 2020 and a KR application 10-2020-0138434, filed Oct. 23, 2020, the entire contents of which are incorporated herein for all purposes by this reference.

TECHNICAL FIELD

The present disclosure relates to a wireless communication system and, more particularly, to a method and device for managing a beam in a wireless communication system.

In particular, it relates to a method of aligning a beam and tracking a beam in sidelink (SL) communication.

BACKGROUND

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PCS interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and device for managing a beam in a wireless communication system The present disclosure relates to a method of aligning a beam between terminals in sidelink (SL) communication of a wireless communication system.

The present disclosure relates to a method of performing a link connection between terminals based on beam alignment in sidelink (SL) communication of a wireless communication system.

The present disclosure relates to a method of tracking a beam between link-connected terminals in sidelink (SL) communication of a wireless communication system.

The technical objects to be achieved in the present disclosure are not limited to the matters mentioned above, and other technical problems which are not described herein may be considered by those of ordinary skill in the art, to which the technical configuration of the present disclosure is applied, from the embodiments of the present disclosure to be described below.

As an example of the present disclosure, a method of operating a reception terminal based on a beam in a wireless communication system may be provided. The method may comprise the reception terminal receiving at least one sidelink synchronization signal/broadcast block (S-SSB) from a transmission terminal, selecting a best beam based on the at least one S-SSB, transmitting a best beam indication signal indicating the selected best beam to the transmission terminal, and performing a link connection with the transmission terminal based on the best beam. Each of the at least one S-SSB may be associated with each beam index based on a beam direction, each beam index may be associated with each sequence offset, and the best beam indication signal may be generated based on a sequence offset corresponding to the best beam.

As an example of the present disclosure, a method of operating a transmission terminal based on a beam in a wireless communication system may be provided. The method may comprise the transmission terminal transmitting at least one sidelink synchronization signal/broadcast block (S-SSB) to a reception terminal, receiving a best beam indication signal indicating a best beam from the reception terminal; and performing a link connection with the reception terminal based on the best beam. Each of the at least one S-SSB may be associated with each beam index based on a beam direction, each beam index may be associated with each sequence offset, and the best beam indication signal may be generated based on a sequence offset corresponding to the best beam.

As an example of the present disclosure, a reception terminal operating based on a beam in a wireless communication system may comprise a transceiver and a processor connected to the transceiver. The processor may receive at least one sidelink synchronization signal/broadcast block (S-SSB) from a transmission terminal, select a best beam based on the at least one S-SSB;

transmit a best beam indication signal indicating the selected best beam to the transmission terminal, and perform a link connection with the transmission terminal based on the best beam. Each of the at least one S-SSB may be associated with each beam index based on a beam direction, each beam index may be associated with each sequence offset, and the best beam indication signal may be generated based on a sequence offset corresponding to the best beam.

As an example of the present disclosure, a transmission terminal operating based on a beam in a wireless communication system may comprise a transceiver and a processor connected to the transceiver. The processor may transmit at least one sidelink synchronization signal/broadcast block (S-SSB) to a reception terminal, receive a best beam indication signal indicating a best beam from the reception terminal, and perform a link connection with the reception terminal based on the best beam. Each of the at least one S-SSB may be associated with each beam index based on a beam direction, each beam index may be associated with each sequence offset, and the best beam indication signal may be generated based on a sequence offset corresponding to the best beam.

As an example of the present disclosure, a device may comprise at least one memory and at least one processor functionally connected to the at least one memory. The at least one processor may enable the device to receive at least one sidelink synchronization signal/broadcast block (S-SSB) from another device, to select a best beam based on the at least one S-SSB, to transmit a best beam indication signal indicating the selected best beam to the other device, and to perform a link connection with the other device based on the best beam. Each of the at least one S-SSB may be associated with each beam index based on a beam direction, each beam index may be associated with each sequence offset, and the best beam indication signal may be generated based on a sequence offset corresponding to the best beam.

As an example of the present disclosure, a non-transitory computer-readable medium storing at least one instruction may comprise the at least one instruction executable by a processor. The at least one instruction may enable a device to receive at least one sidelink synchronization signal/broadcast block (S-SSB) from another device, to select a best beam based on the at least one S-SSB, to transmit a best beam indication signal indicating the selected best beam to the other device, and to perform a link connection with the other device based on the best beam. Each of the at least one S-SSB may be associated with each beam index based on a beam direction, each beam index may be associated with each sequence offset, and the best beam indication signal may be generated based on a sequence offset corresponding to the best beam.

The following may be applied in common.

As an example of the present disclosure, the reception terminal may perform measurement on the at least one S-SSB and select the best beam based on the measurement.

As an example of the present disclosure, the measurement may be performed based on at least one of a signal to interference plus noise ratio (SINR), received signal received power (RSRP) or reference signal received quality (RSRQ).

As an example of the present disclosure, the at least one S-SSB may be sequentially transmitted based on a predetermined cycle in a predetermined period.

As an example of the present disclosure, an S-SSB first transmitted among the at least one S-SSB in the predetermined period may be transmitted at a position spaced apart by an offset from a start point of the predetermined period.

As an example of the present disclosure, information on the predetermined period, information on the predetermined cycle and information on the offset may be scheduled by a base station.

As an example of the present disclosure, a beam index of the at least one S-SSB transmitted in the predetermined period may be sequentially set based on a transmission order.

As an example of the present disclosure, when the reception terminal and the transmission terminal perform the link connection based on the best beam, the reception terminal and the transmission terminal may set information related to a beam indicator monitoring window.

As an example of the present disclosure, the information related to the beam indicator monitoring window may comprise at least one of information on an offset of a beam indication or monitoring window, a duration of a beam indication or monitoring window or a transmission cycle of a beam indication or monitoring window.

As an example of the present disclosure, the reception terminal may measure quality of a serving beam in a state in which the link connection is performed and transmit a beam indicator for a request of a reference signal for beam tracking to the transmission terminal when quality of the serving beam is less than a threshold, and the transmission terminal may monitor the beam indicator only during the duration of the beam indicator monitoring window.

As an example of the present disclosure, the transmission terminal may set an active beam tracking period at a point in time when the beam indicator is monitored in the duration of the beam indicator monitoring window and transmit the reference signal for beam tracking to the reception terminal after a first slot from a point in time when the active beam tracking period is set.

As an example of the present disclosure, the reception terminal may receive the reference signal for beam tracking transmitted by the transmission terminal, measure beam quality based on the received reference signal for beam tracking, and perform beam reporting to the transmission terminal when a measurement value of the beam quality is greater than the threshold, and, when the measurement value of the beam quality is less than the threshold, the beam indicator may be transmitted to the transmission terminal again.

As an example of the present disclosure, the beam reporting or the beam indicator may be received after a second slot from a point in time when the transmission terminal transmits the reference signal for beam tracking.

As an example of the present disclosure, when the transmission terminal receives the beam reporting, the active beam tracking period may end.

As an example of the present disclosure, when the transmission terminal receives the beam indicator again, the active beam tracking period may be extended and the reference signal for beam tracking may be transmitted again after the first slot from a point in time when the beam indicator is received.

The following effects may be obtained by the embodiments based on the present disclosure.

According to the present disclosure, it is possible to provide a method of managing a beam in a wireless communication system.

According to the present disclosure, it is possible to provide a method of aligning a beam between terminals and performing a link connection based on a beam in sidelink communication of a wireless communication system.

According to the present disclosure, it is possible to provide a method tracking a beam between link-connected terminals in sidelink communication of a wireless communication system.

It will be appreciated by persons skilled in the art that that the effects that can be achieved through the present disclosure are not limited to what has been particularly described hereinabove and other advantages of the present disclosure will be more clearly understood from the detailed description. That is, unintended effects of implementing the configuration described in the present disclosure may also be derived by those of ordinary skill in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
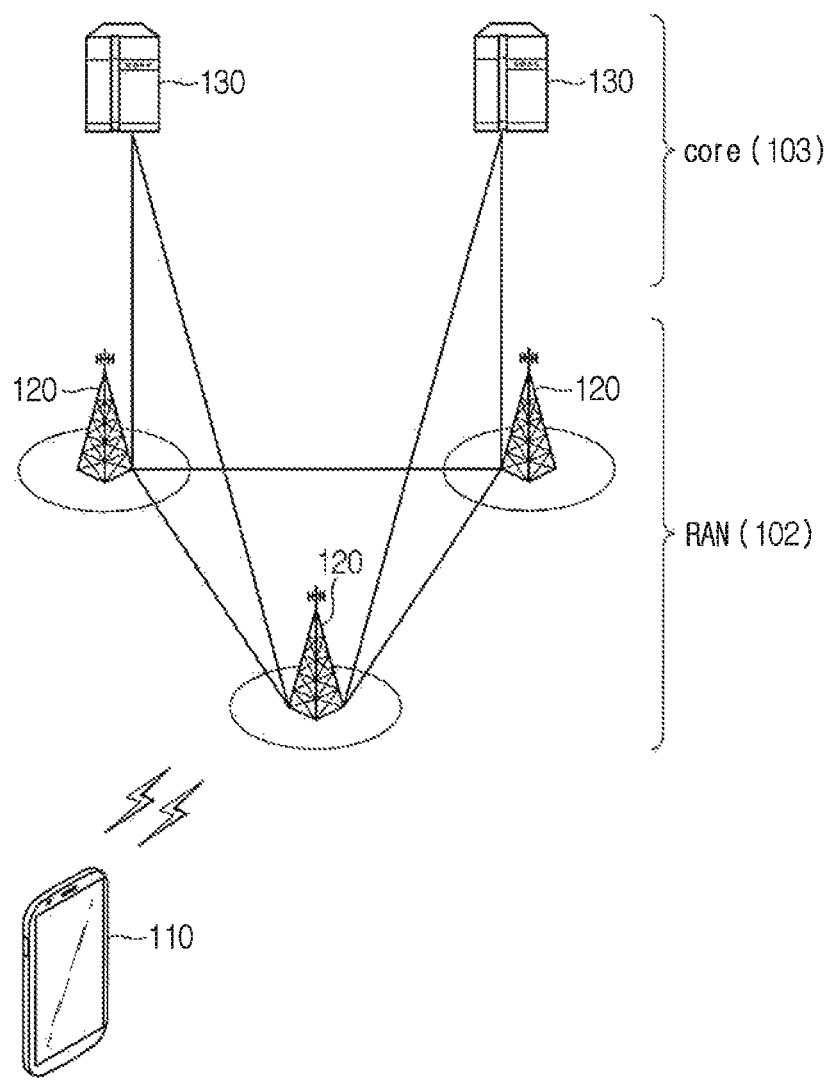
FIG. 1 illustrates a structure of a wireless communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if', in case of may be replaced with 'on the basis of/based on'.

A technical feature described individually in one figure in the present specification may be individually implemented, or may be simultaneously implemented.

In this specification, a higher layer parameter may be set for a terminal, set in advance, or predefined. For example, a base station or a network may transmit a higher layer parameter to a terminal. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard documents (3GPP TS36.XXX, 3GPP TS37.XXX and 3GPP TS38.XXX) published before this specification is filed. For example, the following document may be referred to.

Communication System to which the Present Disclosure is Applicable

FIG. 1 illustrates a structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The radio access network 102 includes a base station 120 that provides a control plane and a user plane to a terminal 110. The terminal 110 may be fixed or mobile, and may be called a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called a fixed station, a Node B, an eNB (eNode B), a gNB (gNode B), an ng-eNB, an advanced base station (ABS) or an access point, a base transceiver system (BTS), or an access point (AP). The core network 103 includes a core network entity 130. The core network entity 130 may be defined in various ways according to functions, and may be called other terms such as a core network node, a network node, and a network equipment.

Components of a system may be referred to differently according to an applied system standard. In the case of LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of a terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of 5G NR standard, the radio access network 102 may be referred to as NG-RAN, and the core network 103 may be referred to as 5GC (5G core). In this case, the core network 103 includes an access and mobility management function (AMF), a user plane function (UPF), and a session management function (SMF). The AMF provides a function for access and mobility management in units of terminals, the UPF performs a function of mutually transferring data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
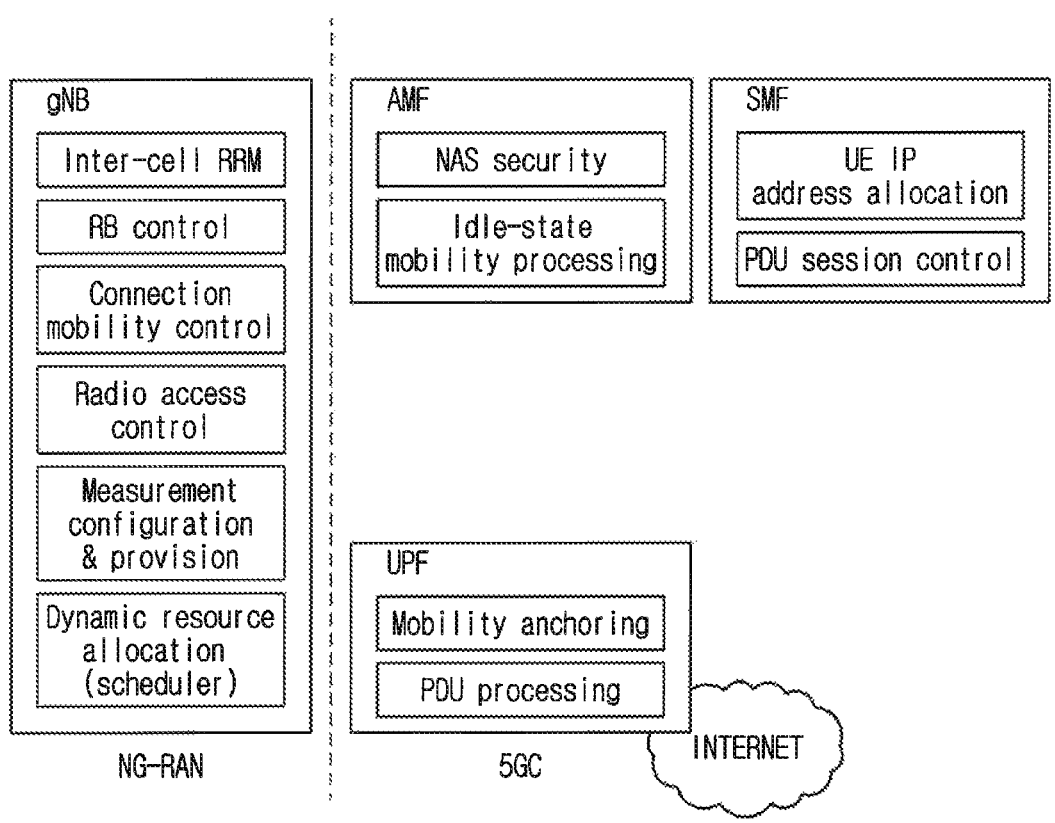
FIG. 2 illustrates a functional division between an NG-RAN and a SGC applicable to the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
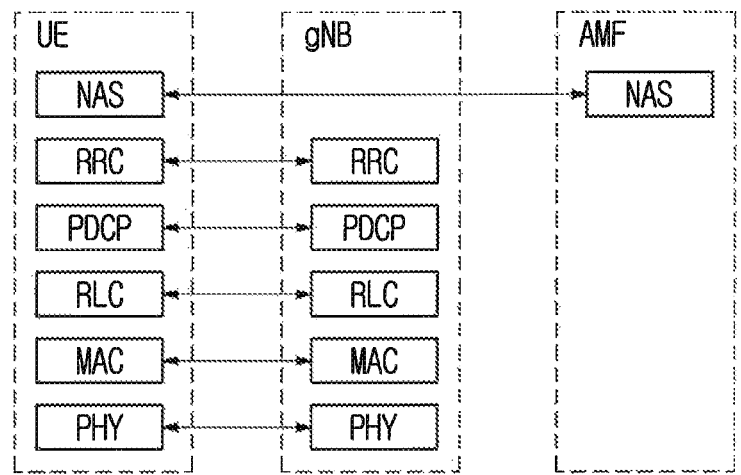
FIG. 3 illustrates a radio protocol architecture applicable to the present disclosure.
Figure 3B:
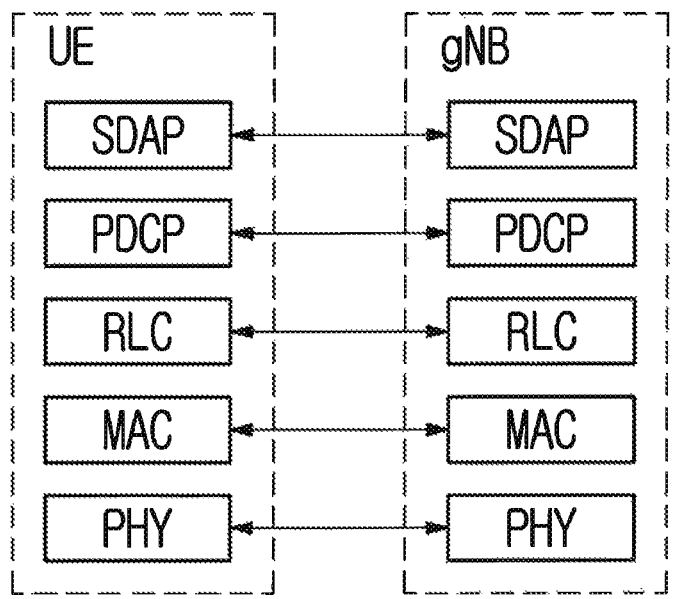

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
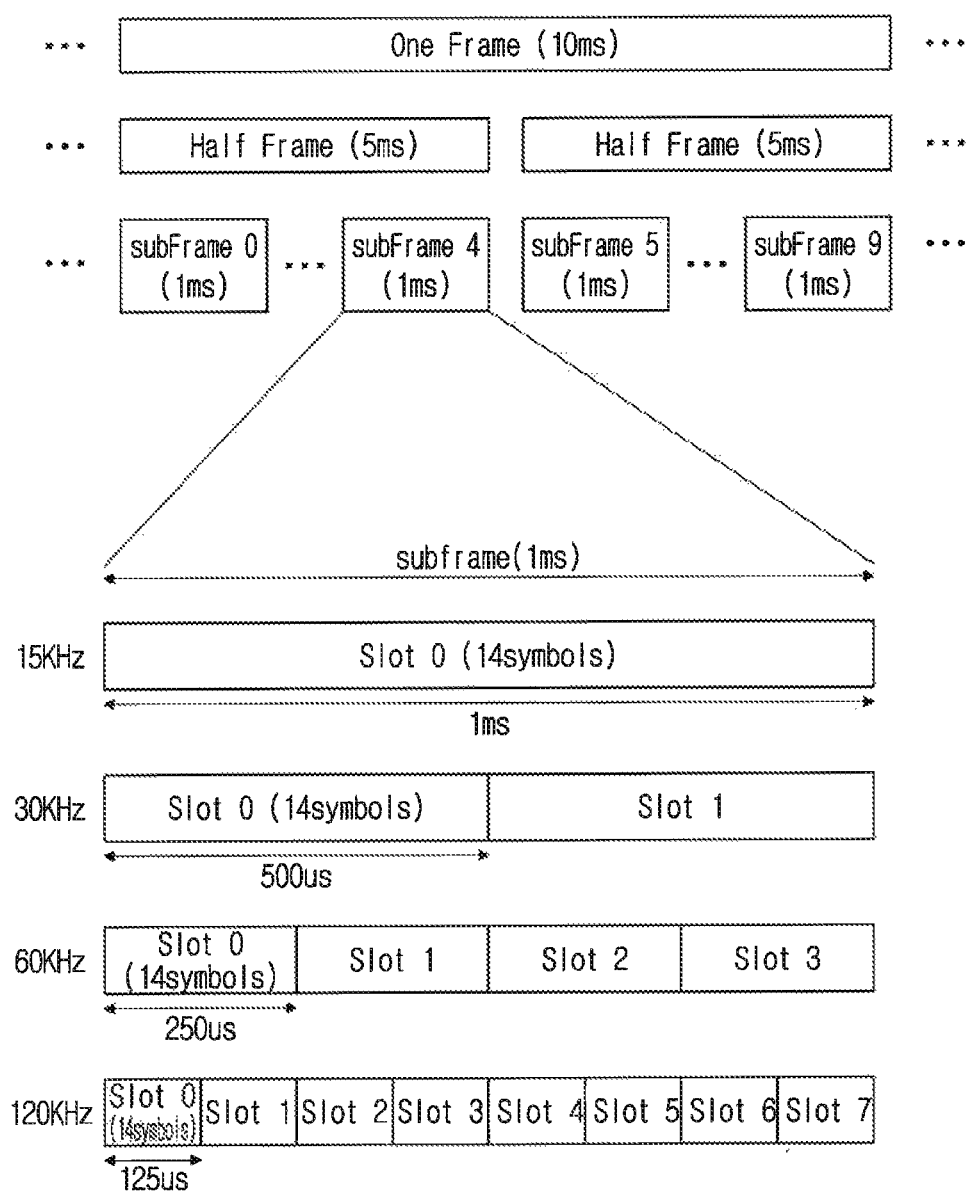
FIG. 4 illustrates a structure of a radio frame in an NR system applicable to the present disclosure.

FIG. 4 illustrates a structure of a radio frame in an NR system applicable to the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{subframe,\mu}_{slot}$) may be varied based on an SCS configuration ($\mu$). For instance, SCS(=$15*2^\mu$), $N^{slot}_{symb}$, $N^{frame,\mu}_{slot}$ and $N^{subframe,\mu}_{slot}$ are 15 KHz, 14, 10 and 1, respectively, when $\mu$=0, are 30 KHz, 14, 20 and 2, respectively, when $\mu$=1, are 60 KHz, 14, 40 and 4, respectively, when $\mu$=2, are 120 KHz, 14, 80 and 8, respectively, when $\mu$=3, or are 240 KHz, 14, 160 and 16, respectively, when $\mu$=4. Meanwhile, in a case where an extended CP is used, SCS(=$15*2^\mu$), $N^{slot}_{symb}$, $N^{frame,\mu}$ and $N^{subframe,\mu}$, are 60 KHz, 12, 40 and 2, respectively, when $\mu$=2.

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a "sub 6 GHz range", and FR2 may mean an "above 6 GHz range" and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
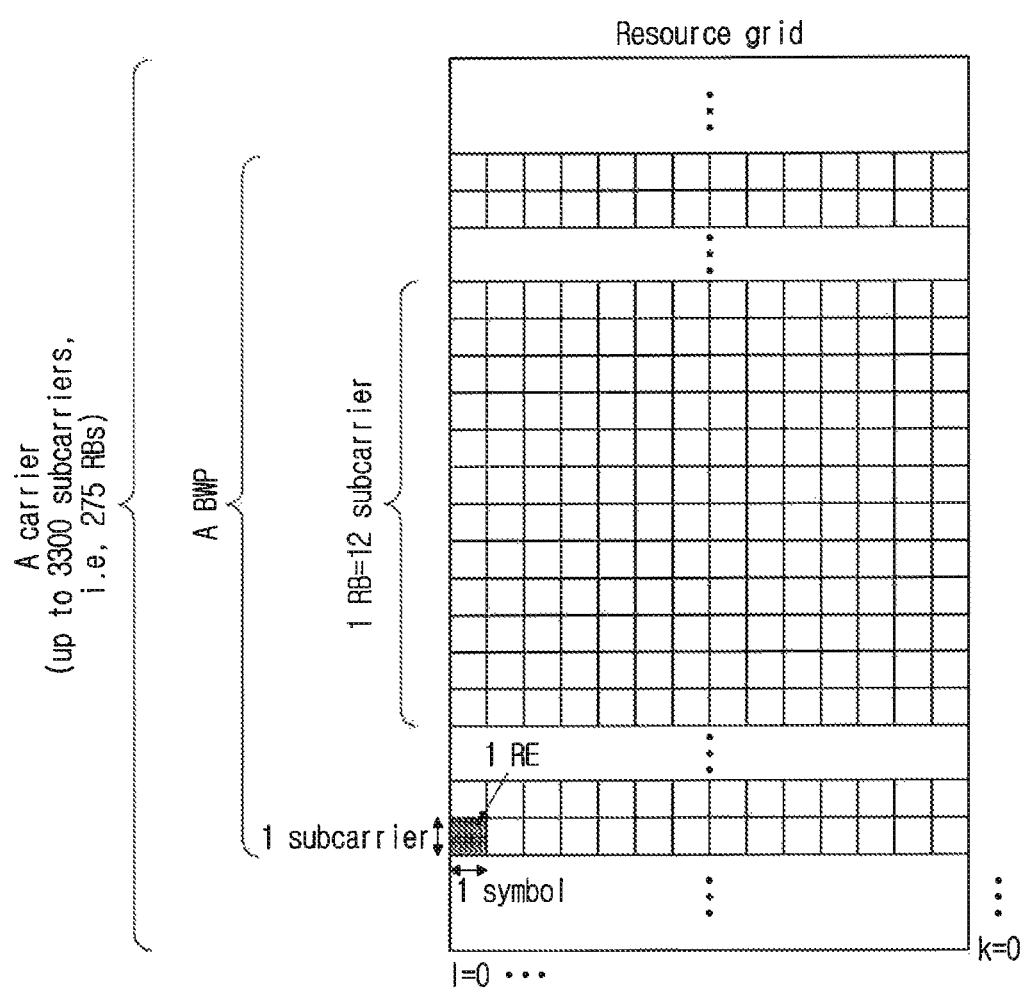
FIG. 5 illustrates a structure of a slot in an NR frame applicable to the present disclosure.

FIG. 5 illustrates a structure of a slot of an NR frame applicable to the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
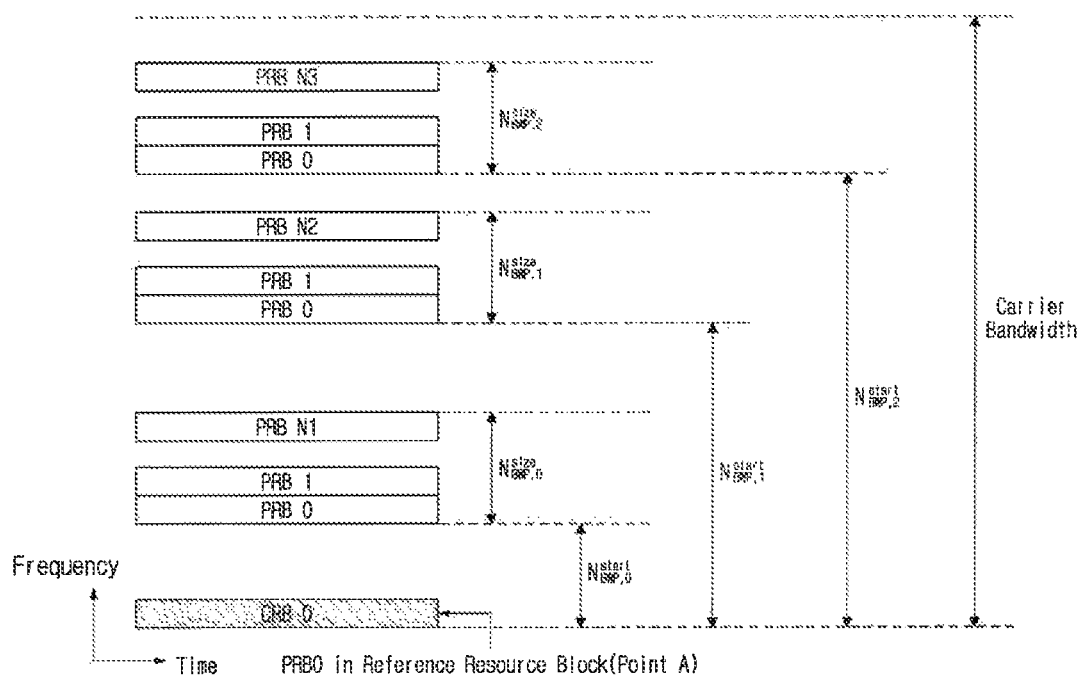
FIG. 6 illustrates an example of a BWP applicable to the present disclosure.

FIG. 6 illustrates an example of a BWP applicable to the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset ($N^{start}_{BWP}$) from the point A, and a bandwidth ($N^{size}_{BWP}$). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 7A:
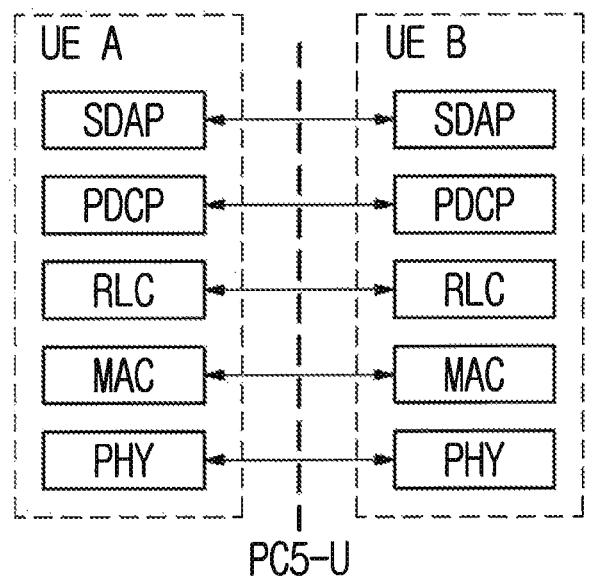
FIGS. 7A and 7B illustrate a radio protocol architecture for a SL communication applicable to the present disclosure.
Figure 7B:
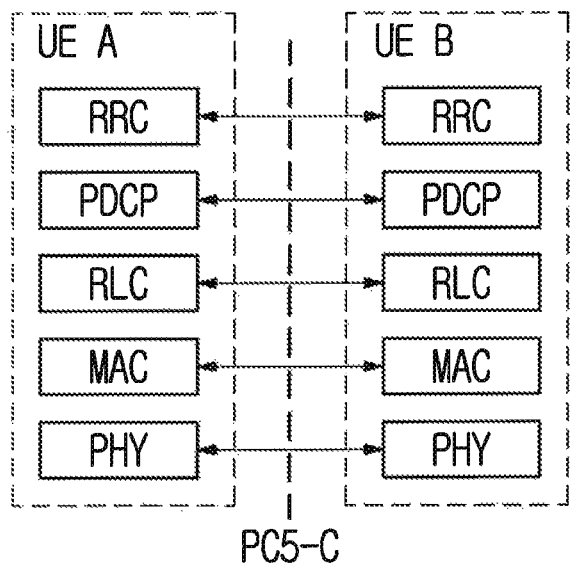

FIGS. 7A and 7B illustrate a radio protocol architecture for a SL communication applicable to the present disclosure. The embodiment of FIGS. 7A and 7B may be combined with various embodiments of the present disclosure. More specifically, FIG. 7A exemplifies a user plane protocol stack, and FIG. 7B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the terminal may generate an S-SS/PSBCH block (that is, S-SSB), and the terminal may map the S-SS/PSBCH block (that is, S-SSB) on a physical resource and transmit it.

TABLE 1

8.4.3.1 Time-frequency structure of an S-SS/PSBCH block
In the time domain, an S-SS/PSBCH block consists of $N_{symb}^{S\text{-}SSB}$ OFDM symbols, numbered in increasing order from 0 to $N_{symb}^{S\text{-}SSB} - 1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N_{symb}^{S\text{-}SSB} = 13$ for normal cyclic prefix and $N_{symb}^{S\text{-}SSB} = 11$ for extended cyclic prefix. The first OFDM symbol in an S-SS/PSBCH block is the first OFDM symbol in the slot.
In the frequency domain, an S-SS/PSBCH block consists of 132 contiguous subcarriers with the subcarriers numbered in increasing order from 0 to 131 within the sidelink S-SS/PSBCH block.
The quantities k and l represent the frequency and time indices, respectively, within one sidelink S-SS/PSBCH block.
For an S-SS/PSBCH block, the UE shall use
antenna port 4000 for transmission of S-PSS, S-SSS, PSBCH and DM-RS for PSBCH;
the same cyclic prefix length and subcarrier spacing for the S-PSS, S-SSS, PSBCH and DM-RS for PSBCH, TABLE 1-continued Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S\text{-}SSB} - 1$ | 0, 1, . . . , 131 |
| DM-RS for PSBCH | 0, 5, 6, . . . , $N_{symb}^{S\text{-}SSB} - 1$ | 0, 4, 8, . . . , 128 |

Synchronization Acquisition of Sl Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 8:
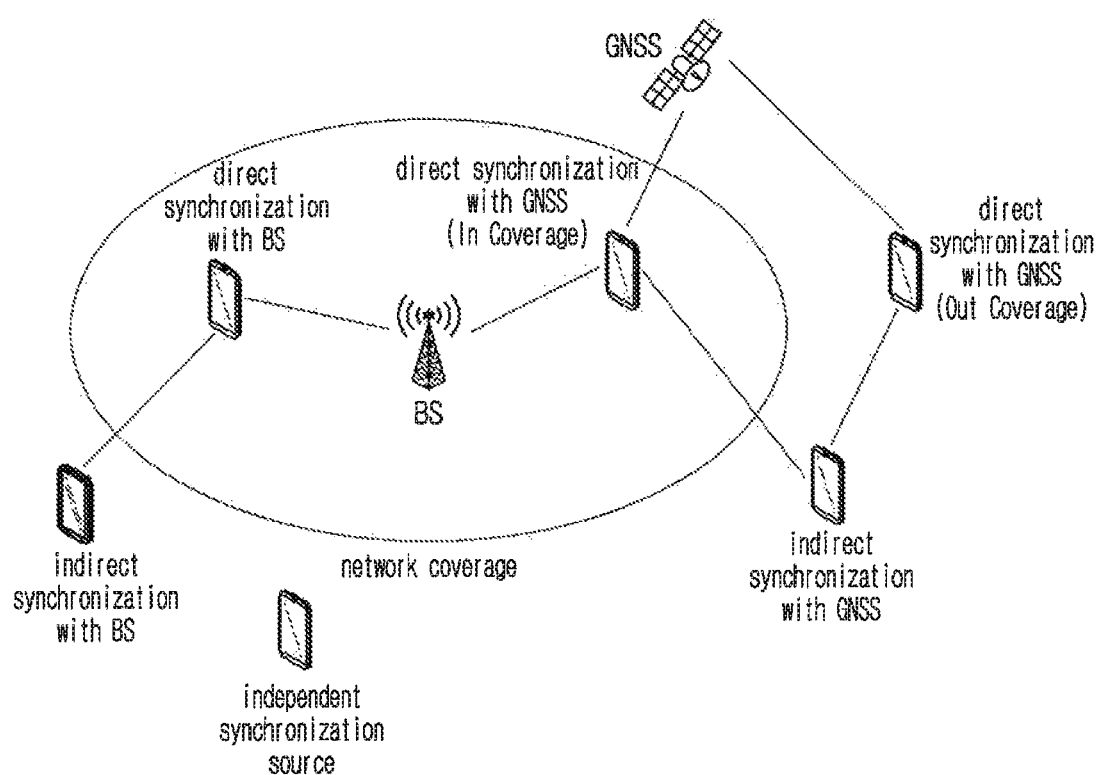
FIG. 8 illustrates a synchronization source or synchronization reference of V2X applicable to the present disclosure.

FIG. 8 illustrates a synchronization source or synchronization reference of V2X applicable to the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the terminal may (re)select a synchronization reference, and the terminal may obtain synchronization from the synchronization reference. In addition, the terminal may perform SL communication (e.g., PSCCH/PSSCH transmission/reception, Physical Sidelink Feedback Channel (PSFCH) transmission/reception, S-SSB transmission/reception, reference signal transmission/reception, etc.) based on the obtained synchronization.

Figure 9A:
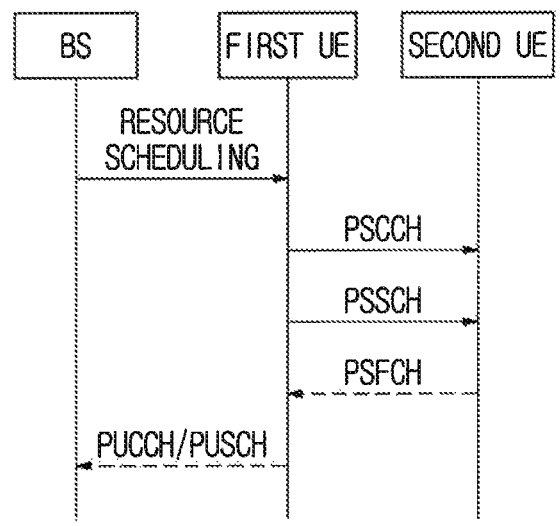
FIGS. 9A and 9B illustrate a procedure of performing V2X or SL communication by a terminal based on a transmission mode applicable to the present disclosure.
Figure 9B:
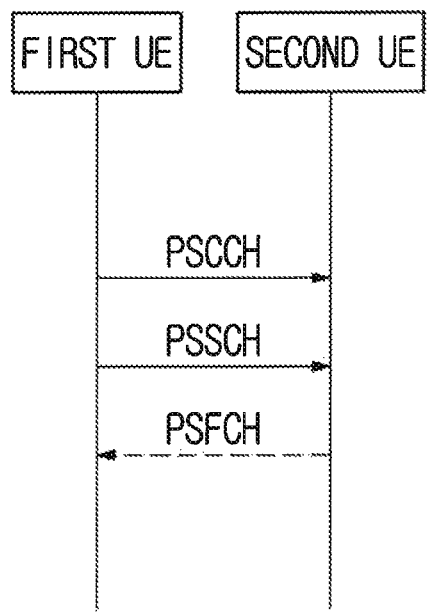

FIGS. 9A and 9B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, the base station may transmit information related to SL resources and/or information related to UL resources to the first terminal. For example, the UL resources may include a PUCCH resource and/or a PUSCH resource. For example, the UL resources may be resources for reporting SL HARQ feedback to the base station.

For example, the first terminal may receive information related to a dynamic grant (DG) resource and/or information related to a configured grant (CG) resource from the base station. For example, the CG resource may include a CG type 1 resource or a CG type 2 resource. In this specification, the DG resource may be a resource configured/allocated by the base station to the first terminal through downlink control information (DCI). In this specification, the CG resource may be a (periodic) resource configured/allocated by the base station to the first terminal through DCI and/or RRC messages. For example, in the case of a CG type 1 resource, the base station may transmit an RRC message including information related to the CG resource to the first terminal. For example, in the case of a CG type 2 resource, the base station may transmit an RRC message including information related to the CG resource to the first terminal, and the base station may transmit DCI related to activation or release of the CG resource to the first terminal.

Subsequently, the first terminal may transmit a PSCCH (e.g., SCI (Sidelink Control Information) or $1^{st}$-stage SCI) to a second terminal based on the resource scheduling. Thereafter, the first terminal may transmit a PSSCH (e.g., $2^{nd}$-stage SCI, MAC PDU, data, etc.) related to the PSCCH to the second terminal. Thereafter, the first terminal may receive a PSFCH related to the PSCCH/PSSCH from the second terminal. For example, HARQ feedback information (e.g., NACK information or ACK information) may be received from the second terminal through the PSFCH. Thereafter, the first terminal may transmit/report HARQ feedback information to the base station through a PUCCH or PUSCH. For example, the HARQ feedback information reported to the base station may be information generated by the first terminal based on HARQ feedback information received from the second terminal. For example, the HARQ feedback information reported to the base station may be information generated by the first terminal based on a preset rule. For example, the DCI may be DCI for SL scheduling. For example, the format of the DCI may be DCI format 3_0 or DCI format 3_1. Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, the first terminal that has selected a resource within the resource pool by itself may transmit a PSCCH (e.g., sidelink control information (SCI) or $1^{st}$-stage SCI) to the second terminal using the resource. Subsequently, the first terminal may transmit a PSSCH (e.g., $2^{nd}$-stage SCI, MAC PDU, data, etc.) related to the PSCCH to the second terminal. Thereafter, the first terminal may receive a PSFCH related to the PSCCH/PSSCH from the second terminal.

Referring to FIG. 9A or 9B, for example, the first terminal may transmit the SCI to the second terminal on the PSCCH. Alternatively, for example, the first terminal may transmit two consecutive SCIs (e.g., 2-stage SCI) to the second terminal on the PSCCH and/or the PSSCH. In this case, the second terminal may decode two consecutive SCIs (e.g., 2-stage SCI) to receive the PSSCH from the first terminal. In this specification, the SCI transmitted on the PSCCH may be referred to as $1^{st}$ SCI, first SCI or $1^{st}$-stage SCI or $1^{st}$-stage SCI format, and SCI transmitted on the PSSCH is $2^{nd}$ SCI, second SCI, $2^{nd}$-stage SCI or $2^{nd}$-stage SCI format. For example, the $1^{st}$-stage SCI format may include SCI format 1-A, and the $2^{nd}$-stage SCI format may include SCI format 2-A and/or SCI format 2-B. Referring to FIG. 9A or 9B, the first terminal may receive a PSFCH. For example, the first terminal and the second terminal may determine a PSFCH resource and the second terminal may transmit HARQ feedback to the first terminal using the PSFCH resource. In addition, referring to FIG. 9A, the first terminal may transmit SL HARQ feedback to the base station through a PUCCH and/or a PUSCH.

Figure 10A:
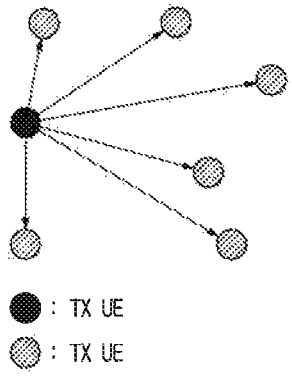
FIGS. 10A to 10C illustrate three cast types applicable to the present disclosure.
Figure 10B:
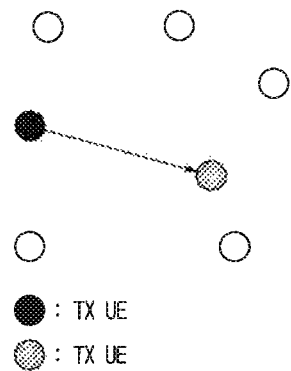
Figure 10C:
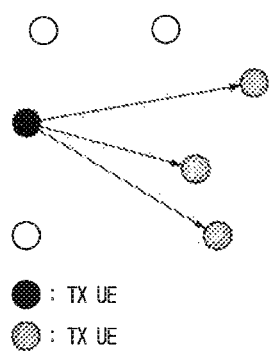

FIGS. 10A to 10C illustrate three cast types applicable to the present disclosure. The embodiment of FIGS. 10A to 10C may be combined with various embodiments of the present disclosure.

Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (Harq) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.
  (1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.
  (2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In this specification, HARQ-ACK may be referred to as ACK, ACK information or positive-ACK information, and HARQ-NACK may be referred to as NACK, NACK information or negative-ACK information.

Sl Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 11:
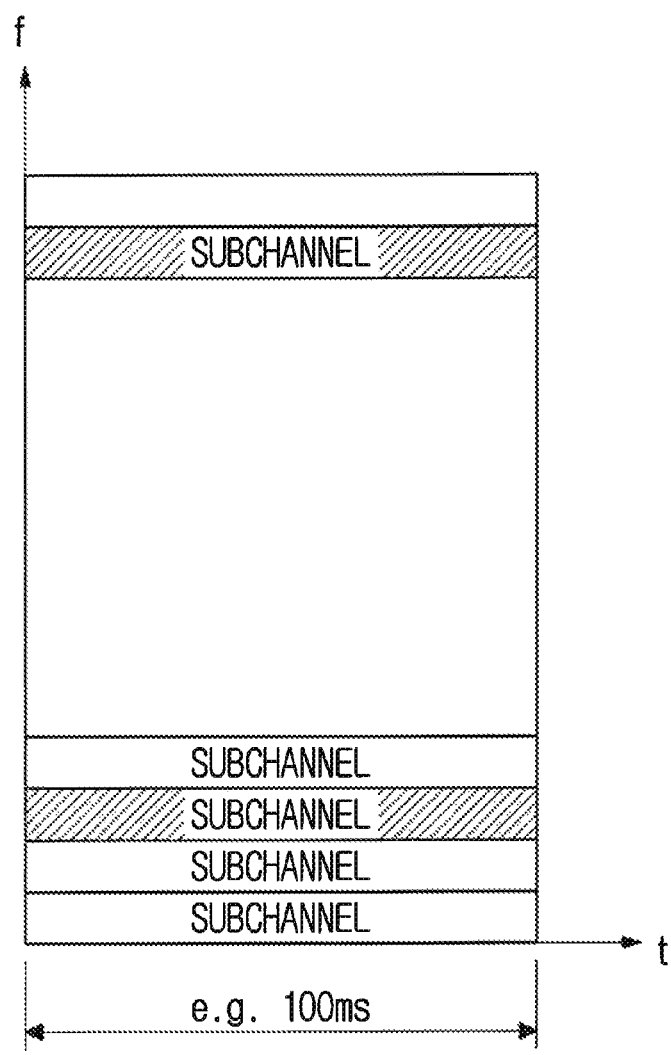
FIG. 11 illustrates a resource unit for channel busy ratio (CBR) measurement, applicable to the present disclosure.

FIG. 11 illustrates resource units for CBR measurement applicable to the present disclosure. The embodiment of FIG. 11 may be combined with various embodiments of the present disclosure.

Referring to FIG. 11, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 11, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

An example of SL CBR and SL RSSI is as follows. In the description below, a slot index may be based on a physical slot index.

SL CBR measured in a slot n is defined as portion of subchannels in which SL RSSI measured by a UE within a resource pool, sensed over CBR measurement window [n−a, n−1], exceeds a (pre)set threshold. Here, according to a higher layer parameter timeWindowSize-CBR, a is equal to 100 or 100.2$^\mu$ slots. SL CBR may be applied to RRC_IDLE intra-frequency, RRC_IDLE inter-frequency, RRC_CONNECTED intra-frequency and RRC_CONNECTED inter-frequency.

SL RSSI is defined as a linear average of a total receive power ([W] unit) observed in a configured subchannel in OFDM symbols of a slot configured for a PSCCH and a PSSCH starting from a second OFDM symbol. For FR1, a reference point for SL RSSI shall be an antenna connector of a UE. For FR2, SL RSSI shall be measured based on a combined signal from antenna elements corresponding to a given receiver branch. For FR1 and FR2, if receive diversity is used by a UE, a reported SL RSSI value shall not be less than corresponding SL RSSI of any of individual receiver branches. SL RSSI may be applied to RRC_IDLE intra-frequency, RRC_IDLE inter-frequency, RRC_CONNECTED intra-frequency and RRC_CONNECTED inter-frequency.

An example of an SL CR (Channel occupancy Ratio) is as follows. The SL CR evaluated in a slot n is defined as dividing a total number of subchannels used for transmission in slot [n−a, n−1] and granted in slot [n, n+b] by a total number of subchannels configured in a transmission pool over slot [n−a, n+b]. SL CR may be applied to RRC_IDLE intra-frequency, RRC_IDLE inter-frequency, RRC_CONNECTED intra-frequency and RRC_CONNECTED inter-frequency. Here, a may be a positive integer and b may be 0 or a may be a positive integer. a and b is determined by UE implementation, and a+b+1=1000 or a+b+1=1000. Ti according to higher layer parameter timeWindowSize-CBR. b<(a+b+1)/2 and n+b shall not exceed a last transmission opportunity of a grant for current transmission. SL CR is evaluated for each (re)transmission. In evaluating SL CR, according to grant(s) present in slot [n+1, n+b] without packet dropping, a UE shall assume that a transmission parameter used in slot n is reused. A slot index may be a physical slot index. SL CR may be calculated per priority level. If it is a member of a sidelink grant defined in TS 38.321, the resource is treated as granted.

SPECIFIC EMBODIMENTS OF THE PRESENT DISCLOSURE

For example, in sidelink communication of a new communication system (e.g., NR), it may be necessary to extend the mmWave band for high data rate and high reliability low latency transmission. For example, the mmWave band may be a 2.4 GHz to 60 GHz region higher than the existing band, but may not be limited thereto. Here, in the mmWave band, data communication is performed through a high frequency band, path loss may be high. Therefore, when a signal is transmitted in the mmWave band, a signal transmission range may be widened by increasing the gain of a transmit antenna through beamforming. Hereinafter, a method of applying beamforming to sidelink communication will be described.

For example, when a transmission terminal (Transmitter UE) and a reception terminal (Receiver UE) perform data communication based on beamforming based on sidelink communication, the transmission terminal and the reception terminal need to perform initial beam alignment for a link connection. More specifically, when sidelink communication is performed based on beamforming, the transmission terminal needs to recognize a direction of a beam received by the reception terminal, and to transmit a signal in the beam direction of the reception terminal. Therefore, in order for the transmission terminal and the reception terminal to perform sidelink communication based on beamforming, it is necessary to check the mutual best beam through beam alignment during initial connection. Hereinafter, a procedure for performing beam alignment will be described. More specifically, a method for quickly performing initial beam alignment by the transmission terminal and the reception terminal will be described.

Figure 12:
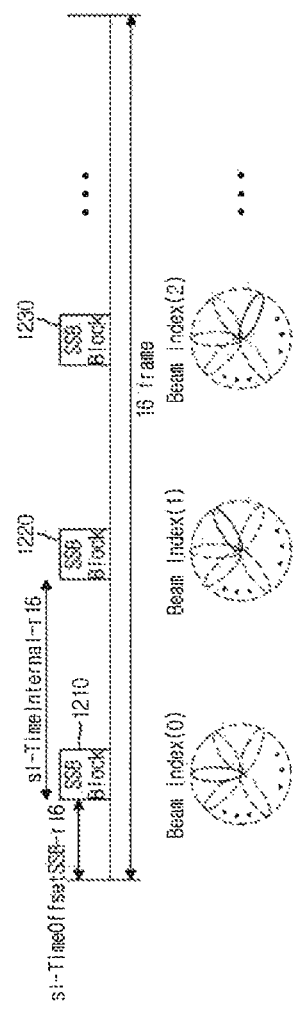
FIG. 12 is a view illustrating a method of transmitting an S-SSB based on a beam index according to an embodiment of the present disclosure.

FIG. 12 is a view illustrating a method of performing beam sweeping according to an embodiment of the present disclosure.

Referring to FIG. 12, the transmission terminal may repeatedly transmit a sidelink synchronization signal/broadcast block (S-SSB) n times within a predetermined period (e.g., 16 frames). Here, a beam index corresponding to the beam direction may be sequentially assigned to each SSB. As an example, the S-SSB transmitted in the above-described predetermined period may be configured based on Table 4 below. For example, the number (n times) of S-SSBs transmitted in the predetermined period may be determined based on a "sl-NumSSB-WithinPeriod" parameter. Also, as an example, an offset at which the S-SSB is transmitted for the first time based on the start point of the predetermined period may be determined based on "sl-TimeOffsetSSB". In addition, a period in which the S-SSB is transmitted in the predetermined period may be determined based on "sl-TimeInterval". However, this is only one example, and S-SSB transmission may be configured based on other parameters not included in Table 4, and is not limited to the above-described embodiment. As an example, an S-SSB transmission related configuration may be set in a synchronization reference terminal (SyncRef UE or transmission terminal) based on Table 4 below, and the synchronization reference terminal (or the transmission terminal) may periodically transmit the S-SSB based on the S-SSB transmission configuration.

TABLE 4

| "sl-NumSSB-WithinPeriod" | ENUMERRATED {n1, n2, n4, n5, n16, n32, n64} |
|---|---|
| "sl-TimeOffsetSSB" | INTEGER (0...1279) |
| "sl-TimeInterval" | INTEGER (0...639) |

At this time, the reception terminal may receive the S-SSB signal transmitted by the transmission terminal for a predetermined period (e.g., 16 frames) through a beam sweep and search for a best beam through measurement. For example, the reception terminal may measure at least one of a signal to interference plus noise ratio (SINR), received signal received power (RSRP) or reference signal received quality (RSRQ) based on the received beam index of the S-SSB and derive a best beam index. Thereafter, the reception terminal may set a sequence offset corresponding to the best beam based on a sequence with respect to the derived best beam index. As an example, the sequence offset may be associated with a beam index. That is, the sequence offset may serve as a best beam indicator. As an example, each beam index may be associated with each corresponding sequence offset. Accordingly, the reception terminal may check the best beam and transmit a signal to the transmission terminal according to the sequence offset corresponding to the best beam index to transmit the best beam index to the transmission terminal.

As an example, the reception terminal may set a sequence offset corresponding to the best beam and transmit an indicator signal to the transmission terminal using a preconfigured resource pool. Through this, the transmission terminal may derive the best beam of the reception terminal. That is, the reception terminal may transmit the best beam indicator signal to the transmission terminal through a preconfigured resource. Through this, beam alignment may be performed quickly without configuring a separate time/frequency resource, thereby reducing delay and complexity.

As another example, the transmission terminal and the reception terminal may perform beam alignment by performing a random access procedure. However, as the random access procedure is performed, the transmission terminal and the reception terminal may need to exchange a number of signals, thereby causing latency. Accordingly, the reception terminal may recognize the best beam of the transmission terminal and transmit the beam indicator signal to the transmission terminal based on the sequence offset using the preconfigured resource as described above, thereby reducing latency and complexity in beam alignment.

Here, the sequence may be set to any one of a zadoff-chu sequence or an m-sequence, but is not limited thereto and other sequences may be used. As an example, the Zadoff-Chu sequence may be a sequence having a constant amplitude, and may be a sequence constructed based on Equation 1 below. Also, the m-sequence may be a maximum-length sequence, and may be a pseudo-random binary sequence.

$$x_u(n) = e^{-j\frac{\min(n+1)}{N_{ZC}}}, 0 \leq n \leq N_{ZC} - 1 \quad \text{[Equation 1]}$$

For example, the maximum value of the signal transmitted by the reception terminal to indicate the beam may vary depending on the sequence offset, and the transmission terminal checks the maximum value of the received signal to check the sequence offset, and, through this, the best beam may be indicated. That is, each beam index may be distinguished using a sequence and an offset value of the sequence, and may not be limited to the above-described sequence. However, hereinafter, for convenience of description, the Zadoff-Chu sequence will be focused upon.

Figure 13:
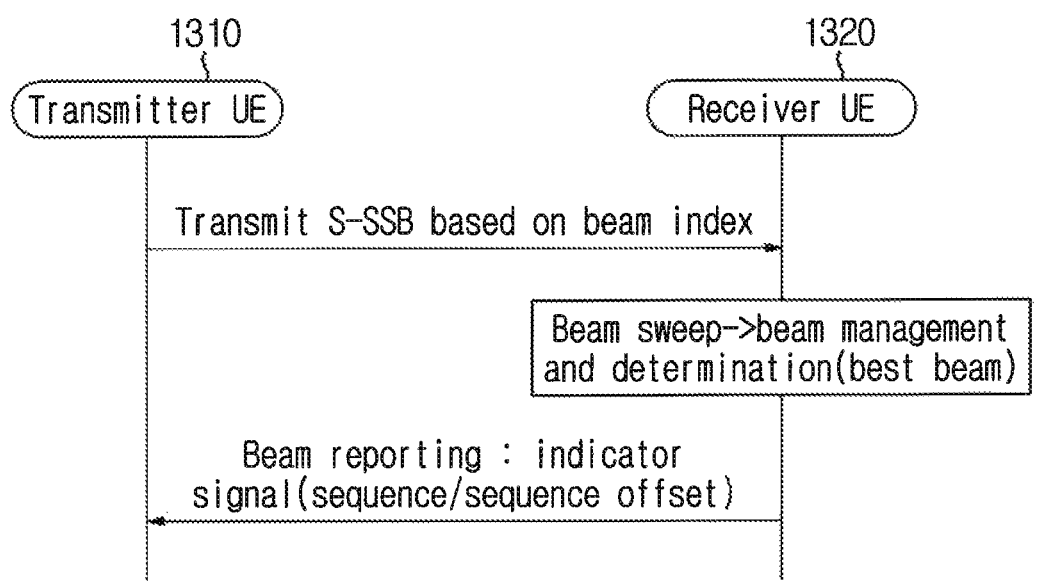
FIG. 13 is a view illustrating a method of, at a reception terminal, receiving a beam from a transmission terminal based on a beam sweep according to an embodiment of the present disclosure.

Referring to FIG. 12, the transmission terminal may transmit each SSB 1210, 1220 or 1230 based on the S-SSB configuration set based on Table 4 above. In this case, each beam index may be set in each SSB 1210, 1220 or 1230. As a specific example, beam index 0 is set in the first S-SSB 1210, beam index 1 is set in the second S-SSB 1220, beam index 2 is set in the third S-SSB 1310, and beam indices may be sequentially set in the same manner. However, this is only one example and is not limited to the above-described embodiment. Here, referring to FIG. 13, the transmission terminal 1310 (transmitter UE) may transmit each SSB 1210, 1220 or 1230 during a predetermined period as described above. In this case, the reception terminal 1320 (receiver UE) may perform beam measurement through a beam sweep and select a best beam. Thereafter, the reception terminal 1320 may transmit a beam indicator signal to the transmission terminal 1310 for reporting on the best beam. As an example, the beam indicator signal may indicate a beam index associated with a sequence offset based on the sequence offset.

Figure 14:
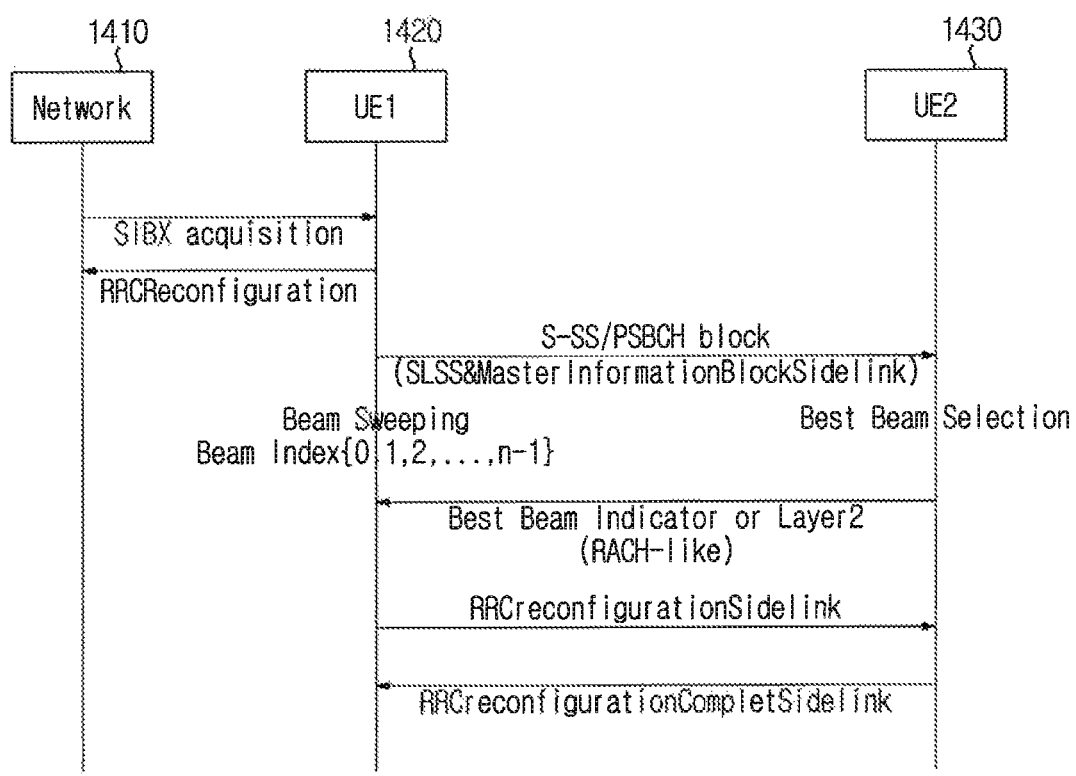
FIG. 14 is a view illustrating a method of performing a link connection based on beam alignment according to an embodiment of the present disclosure.

As a more specific example, FIG. 14 is a view illustrating a method of reporting a best beam index based on an S-SSB according to an embodiment of the present disclosure. For example, referring to FIG. 14, a network 1410 may provide system information to Terminal 1 (UE1) 1420 through a system information block (SIB) and set a RRC configuration with UE1 1420. Here, UE1 1420 may receive sidelink configuration information included in the system information received from the network.

As a specific example, UE1 1420 is a terminal that performs sidelink communication based on a base station scheduling mode (mode 1), and may receive sidelink communication related configuration information and resource information from the base station and perform sidelink communication with UE2 1430. In this case, the sidelink communication related configuration information may include the information shown in Table 4 and other information, through which UE1 1420 may set a configuration related to S-SSB transmission.

As another example, UE1 1420 may be a terminal operating in a mode (mode 2) that control is not performed by a base station and operation is performed by directly selecting a resource from a resource pool based on sensing. In this case, as an example, a sidelink communication related configuration may be preset in UE1 1420, and the terminal may perform sidelink communication with UE2 1430 through the preset sidelink communication related configuration, and is not limited to the above-described embodiment.

Based on the above description, UE1 1420 may check configuration information for performing sidelink communication with UE2 1430, and may operate based thereon. In this case, as an example, UE1 1420 may broadcast S-SSBs based on the sidelink configuration information. More specifically, UE1 1420 may transmit each S-SSB in a corresponding beam direction while sweeping the beam for a predetermined period (e.g., 16 frames). Here, a corresponding beam direction may be set for each S-SSB, and a beam index may be set based on the beam direction. Thereafter, UE2 1430 may recognize a best beam among the S-SSBs transmitted by UE1 1420. For example, UE2 1430 may recognize the best beam among the S-SSBs transmitted by UE1 1420 based on at least one of SINR, RSRP or RSRQ. In this case, the UE2 1430 may recognize the best beam based on the beam index corresponding to each S-SSB, and set an offset for a sequence based on a best beam index. That is, each beam index may be distinguished based on the offset of the sequence. UE2 1430 may apply an offset corresponding to the best beam index to the sequence and transmit a beam indicator signal to UE1 1420. In this case, UE1 1420 may derive the best beam index based on a peak while performing decoding on the beam indicator signal. For example, the peak of the signal may vary depending on the sequence offset, and the UE1 1420 check the corresponding sequence offset by checking the peak of the signal. Here, since each sequence offset is associated with each beam index, UE1 1420 may decode the beam indicator signal transmitted by UE2 1430 to check the best beam index information.

Thereafter, UE1 1420 may transmit a sidelink RRC reconfiguration (RRCReconfigurationSidelink) message to UE2 1430 in the best beam direction based on the checked best beam index. UE2 1430 may receive a sidelink RRC reconfiguration (RRCReconfigurationSidelink) message transmitted by UE1 1420 in the best beam direction, and transmit a sidelink RRC reconfigurationComplete message to UE1 1420 to perform initial beam alignment, thereby being connected to UE1 1420.

That is, as described above, UE1 1420 and UE2 1430 may perform s mutual link connection by performing beam alignment, and, since a separate random access procedure is not performed, latency may be reduced and implementation complexity may be reduced.

Next, when the transmission terminal and the reception terminal perform a beam alignment to perform a mutual link connection, beam tracking may be performed. More specifically, after the transmission terminal and the reception terminal perform a link connection, beam tracking and beam switching operations may be required to continue the link connection.

For example, the transmission terminal and the reception terminal may require a process of selecting a beam optimized for transmission and reception by measuring signal quality for all directional beams, which will be described below. Also, as an example, when beam tracking is frequently performed to maintain a link connection, power consumption may increase based on a measurement operation, etc. and thus a method for minimizing beam tracking may be required, which will be described below.

As a specific example, the reception terminal may periodically perform beam tracking in order to maintain the link connection. Here, the reception terminal may perform beam tracking in a beam monitoring (BM) period. As an example, the BM period may be set to wide BM (wide BM) or narrow BM (narrow BM) based on link quality. In this case, since the reception terminal needs to periodically perform beam tracking in the BM period, power consumption may increase. Here, in consideration of a rapidly changing channel environment in sidelink communication, an efficient beam measurement and maintenance method in a beam tracking period may be required.

More specifically, in sidelink communication, a method of preventing a reference signal for beam measurement from being requested when a channel environment is good and increasing a beam measurement period to perform stable beam tracking when the channel environment is bad may be considered. That is, the beam measurement period may be variably set, and, through this, beam tracking may be efficiently performed.

Figure 15:
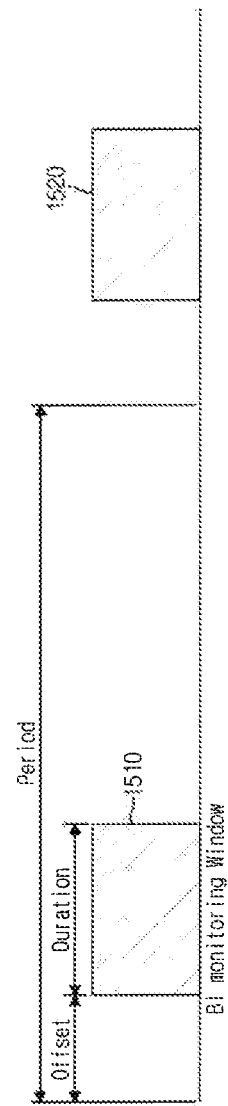
FIG. 15 is a view illustrating a method of setting a beam indicator monitoring window according to an embodiment disclosure.

FIG. 15 is a view illustrating a method of setting a beam indicator monitoring window according to an embodiment of the present disclosure.

As described above, in mmWave sidelink communication, after a link connection between the transmission terminal and the reception terminal is performed, an operation for maintaining the link connection may be required. In this case, it may be necessary for the transmission terminal and the reception terminal to select a beam optimized for transmission and reception by measuring signal quality for all directional beams. Here, the transmission terminal and the reception terminal may need a method of efficiently performing beam management to minimize beam tracking.

As an example, the reception terminal and the transmission terminal may set at least one of a duration, period or offset of a beam indicator (BI) monitoring window (BI monitoring window) allowing beam tracking. As a specific example, the reception terminal and the transmission terminal may set the beam indicator monitoring window in consideration of the channel environment. For example, the channel environment may vary based on the movement speeds or multiple paths of the reception terminal and the transmission terminal and may not be limited to a specific channel environment.

In this case, referring to FIG. 15, the beam indicator monitoring windows 1510 and 1520 may be activated for a duration at a point spaced apart by an offset from a cycle start point based on the above-described cycle value. Here, the transmission terminal may monitor the beam indicator signal transmitted by the reception terminal only during the beam indicator monitoring windows 1510 and 1520 within one cycle for beam indicator monitoring.

In this case, based on whether the transmission terminal monitors the beam indicator signal in the beam indicator monitoring window, it may determine whether to transmit the reference signal for beam tracking.

As another example, the reception terminal and the transmission terminal may further set a parameter related to the number of beam indicator monitoring windows in one cycle in relation to a beam indicator (BI) monitoring window allowing beam tracking. For example, when the movement speed is fast or the channel environment is not good, the transmission terminal may set a plurality of beam indicator monitoring windows in one cycle. As another example, it may be possible for the transmission terminal to set a large duration of the beam indicator monitoring window when the movement speed is fast or the channel environment is not good, and is not limited to the above-described embodiment.

Figure 16:
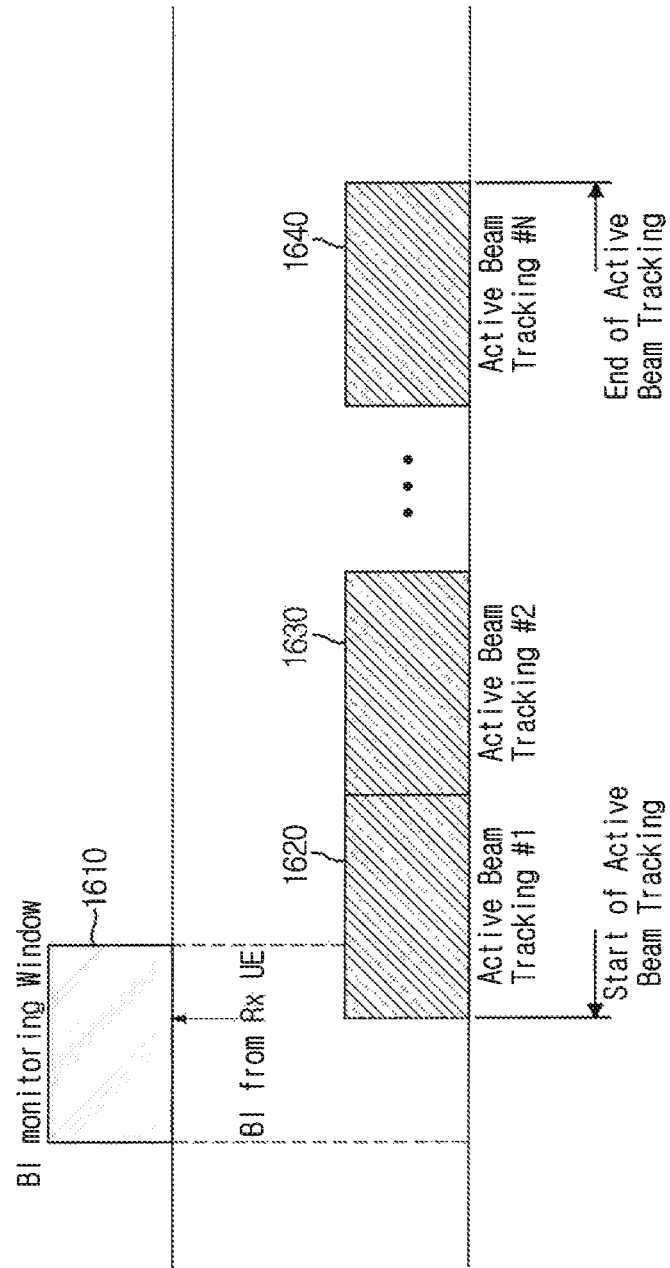
FIG. 16 is a view illustrating a method of setting an active beam tracking periods according to an embodiment of the present disclosure.

FIG. 16 is a view illustrating a method of monitoring a beam indicator by a transmission terminal according to an embodiment of the present disclosure. Referring to FIG. 16, when the transmission terminal monitors the beam indicator in a beam indicator monitoring window 1610, the transmission terminal may use a beam indicator signal to set active beam tracking periods 1620, 1630 and 1640 for transmission of a reference signal for beam tracking and transmit the reference signal for beam tracking to the reception terminal. On the other hand, when the transmission terminal fails to monitor the beam indicator in the beam indicator monitoring window 1610, the transmission terminal may awake in a next beam indicator monitoring window to monitor the beam indicator again.

Here, when the active beam tracking periods 1620, 1630 and 1640 are set by the beam indicator monitoring, the transmission terminal may receive at least one of beam reporting (BR) or a beam indicator (BI) at a last point in time of the active beam tracking periods 1620, 1630 and 1640. In this case, when the transmission terminal receives beam reporting, the transmission terminal may end the active beam tracking periods and perform beam management. Thereafter, the transmission terminal may transmit/receive sidelink data. On the other hand, when the transmission terminal receives the beam indicator again, the transmission terminal may repeat or extend the active beam tracking periods and transmit the reference signal for beam tracking again.

Figure 17:
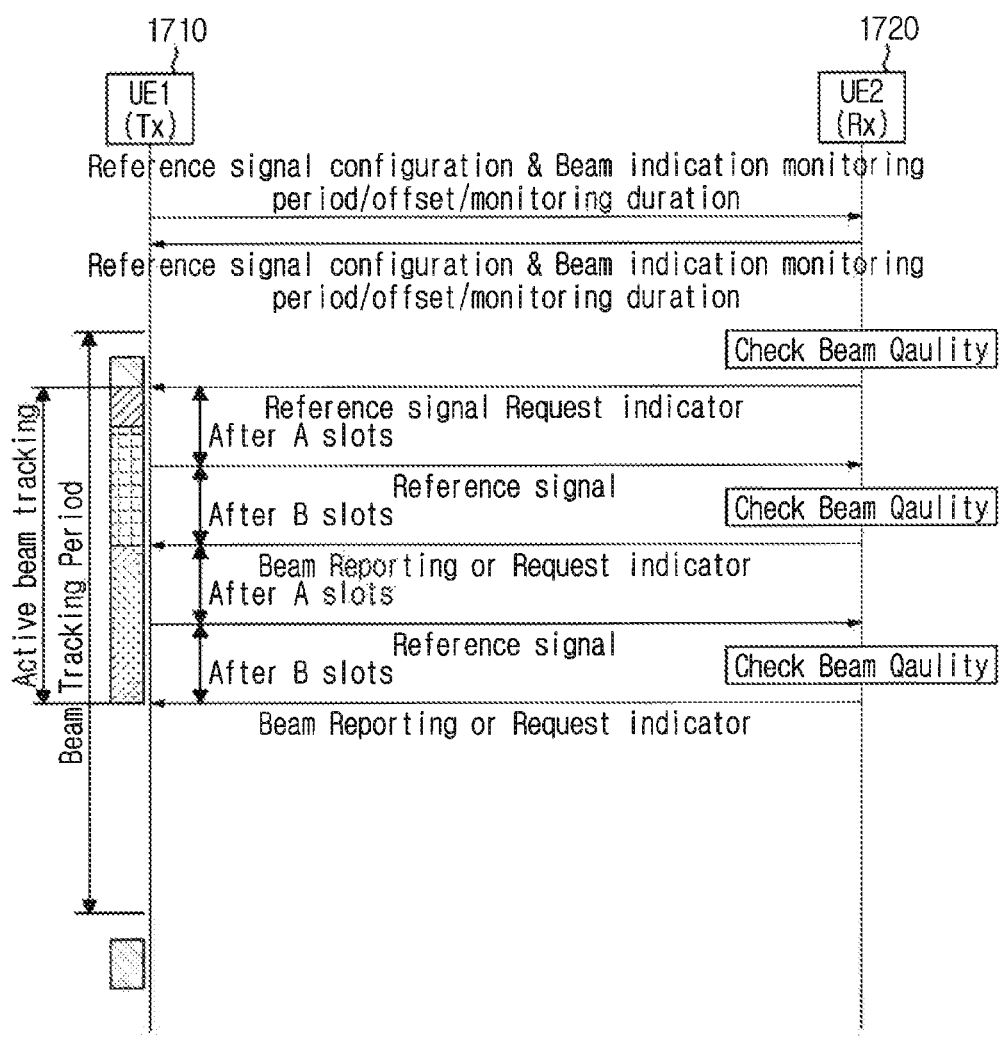
FIG. 17 is a view illustrating a method of tracking a beam according to an embodiment of the present disclosure.

More specifically, FIG. 17 is a view illustrating a method of setting an active beam tracking period according to the present disclosure. Referring to FIG. 17, a transmission terminal (UE1) 1710 and a reception terminal (UE2) 1720 may complete a link connection based on initial beam alignment, as described above. Thereafter, the transmission terminal 1710 and the reception terminal 1720 may set at least one of a reference signal configuration for beam tracking, beam indication monitoring period, an offset, and a monitoring duration for beam indicator monitoring, as described above. In this case, as an example, the transmission terminal 1710 may set at least one of a beam indication monitoring period, an offset, and a monitoring duration as a parameter that allows beam measurement in consideration of the speed of the transmission terminal, multiple paths, and other channel environments.

Then, the reception terminal 1720 may perform a measurement on beam quality. For example, the reception terminal may measure serving beam quality based on at least one of SINR, RSRP or RSRQ, and may compare the measured beam quality with a threshold. In this case, when the beam quality is less than the threshold, the reception terminal 1720 may transmit a beam indicator for requesting transmission of a reference signal for beam tracking to the transmission terminal 1710. On the other hand, when the beam quality is greater than the threshold, the reception terminal 1720 may not transmit a beam indicator for requesting transmission of a reference signal for beam tracking to the transmission terminal 1710. Here, the transmission terminal 1710 may monitor the beam indicator transmitted by the reception terminal 1720 in the above-described beam indication monitoring period. For example, when the transmission terminal 1710 fails to monitor the beam indicator in the beam indication monitoring period, the transmission terminal 1710 may transmit/receive data without transmitting the reference signal for beam tracking. That is, if the transmission terminal 1710 fails to monitor the beam indicator in the beam indication monitoring period, it may determine that the beam quality is good and perform data transmission/reception.

On the other hand, when the beam quality is less than the threshold, the reception terminal 1720 may transmit a beam indicator for requesting transmission of a reference signal for beam tracking to the transmission terminal 1710. In this case, the transmission terminal 1710 may monitor the beam indicator in the beam indication monitoring period. In this case, the transmission terminal 1710 may set an active beam tracking period from a point in time when the beam indicator is received. In this case, the transmission terminal 1710 may transmit the reference signal for beam tracking to the reception terminal 1720 after the A slot from the point in time when a beam indicator slot is received. As an example, the A slot in which the reference signal for beam tracking is transmitted may be set when the transmission terminal 1710 and the reception terminal 1720 configure the reference signal for beam tracking or may be a preset value and is not limited to a specific embodiment.

At this time, when the transmission terminal 1710 transmits the reference signal for beam tracking, the reception terminal 1720 may measure beam quality based on the reference signal for beam tracking, and compare it with the above-described threshold. Here, when the beam quality is greater than the threshold, the reception terminal 1720 may transmit beam reporting to the transmission terminal 1710 after a B slot from the A slot. For example, the B slot may be set when the transmission terminal 1710 and the reception terminal 1720 configure the reference signal for beam tracking or may be a preconfigured value, and is not limited to a specific embodiment. On the other hand, when the beam quality is less than the threshold, the reception terminal 1720 may transmit the beam indicator to the transmission terminal 1710 after the B slot from the A slot.

In this case, the transmission terminal 1710 may monitor the beam reporting or the beam indicator in the B slot. For example, when the transmission terminal 1710 receives the beam reporting in the B slot, it may perform beam management, end the active beam tracking period, and perform data transmission/reception.

On the other hand, when the transmission terminal 1710 receives the beam indicator in the B slot, the active beam tracking period may be extended or repeated. For example, the transmission terminal 1710 may transmit the reference signal for beam tracking to the reception terminal 1720 again after the A slot from the B slot. In addition, the reception terminal 1720 may measure the beam quality again through the reference signal for beam tracking, compare it with a threshold, and then transmit the beam reporting or the beam indicator to the transmission terminal 1710. Therefore, the transmission terminal 1710 and the reception terminal 1720 may efficiently perform beam tracking.

As another example, a maximum number of transmissions for the reference signal for beam tracking may be set. As an example, the maximum number of transmissions for the reference signal for beam tracking may be set when the transmission terminal 1710 and the reception terminal 1720 configure the reference signal for beam tracking or may be a preset value and is not limited to a specific embodiment. In this case, if the transmission terminal 1710 continuously receives the beam indicator from the reception terminal 1720 in the active beam tracking period, the transmission terminal 1710 has to continuously transmit the reference signal for beam tracking, thereby increasing power consumption. In consideration of the above, the transmission terminal 1710 may count the number of transmissions of the reference signal for beam tracking, and may determine that the link connection is broken if the number of transmissions exceeds the maximum number of transmissions. That is, the transmission terminal 1710 may regard the beam-based link connection as being released, and may perform beam alignment to perform a link connection with the reception terminal 1720 again, but is not limited to the above-described embodiment.

Figure 18:
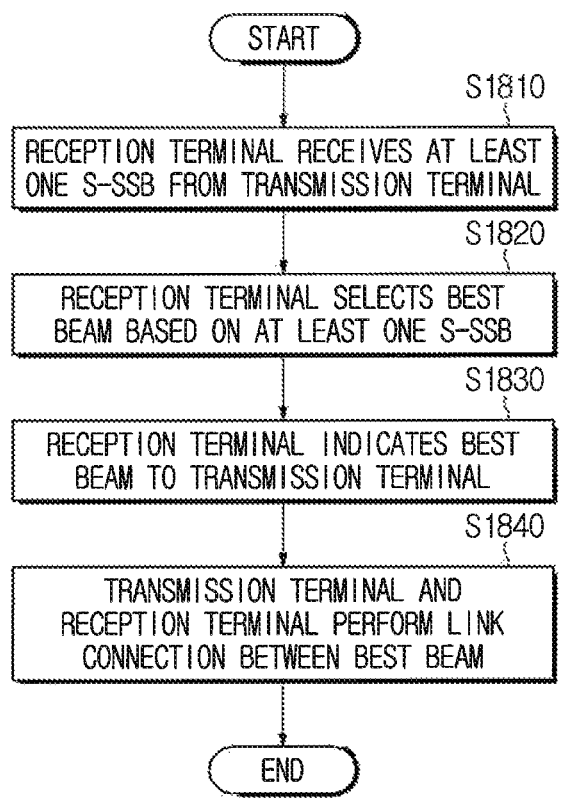
FIG. 18 is a flowchart illustrating a method of performing beam alignment according to an embodiment of the present disclosure.

FIG. 18 is a flowchart illustrating a method of performing beam alignment according to an embodiment of the present disclosure.

Referring to FIG. 18, a reception terminal may receive at least one S-SSB from a transmission terminal (S1810). In this case, each S-SSB may have a different beam direction. In addition, each S-SSB may be associated with each beam index based on the beam direction, through which the reception terminal may recognize the beam direction. For example, at least one S-SSB may be sequentially transmitted based on a predetermined cycle in a predetermined period (e.g. 16 frames). The S-SSB first transmitted in the predetermined period may be transmitted at a position spaced apart by an offset from the start point of the predetermined period, and a beam index associated with the S-SSB may be sequentially assigned.

In addition, as an example, the transmission terminal and the reception terminal may obtain information on the above-described predetermined period, cycle information, and information on the offset through base station scheduling. As another example, the above-described information may be preconfigured in the transmission terminal and the reception terminal, and is not limited to the above-described embodiment.

Thereafter, the reception terminal may perform measurement on the S-SSB and select a best beam (S1820). As an example, the reception terminal may measure beam quality on the received S-SSB based on at least one of SINR, RSRP or RSRQ, as described above.

Thereafter, the reception terminal may transmit a best beam indication signal indicating the selected best beam to the transmission terminal. Here, each beam index may be associated with an offset of a sequence. As an example, the sequence may be a Zadoff-Chu sequence or an m-sequence, but is not limited to the above-described embodiment. In this case, each beam index may correspond to a sequence offset, and the reception terminal may generate a beam indicator signal based on the sequence offset corresponding to the best beam index. For example, the transmission terminal may check the sequence offset by checking the peak of the beam indicator signal, and may check the best beam index by checking the beam index corresponding to the sequence offset. Thereafter, the transmission terminal and the reception terminal may perform a link connection based on the best beam.

Figure 19:
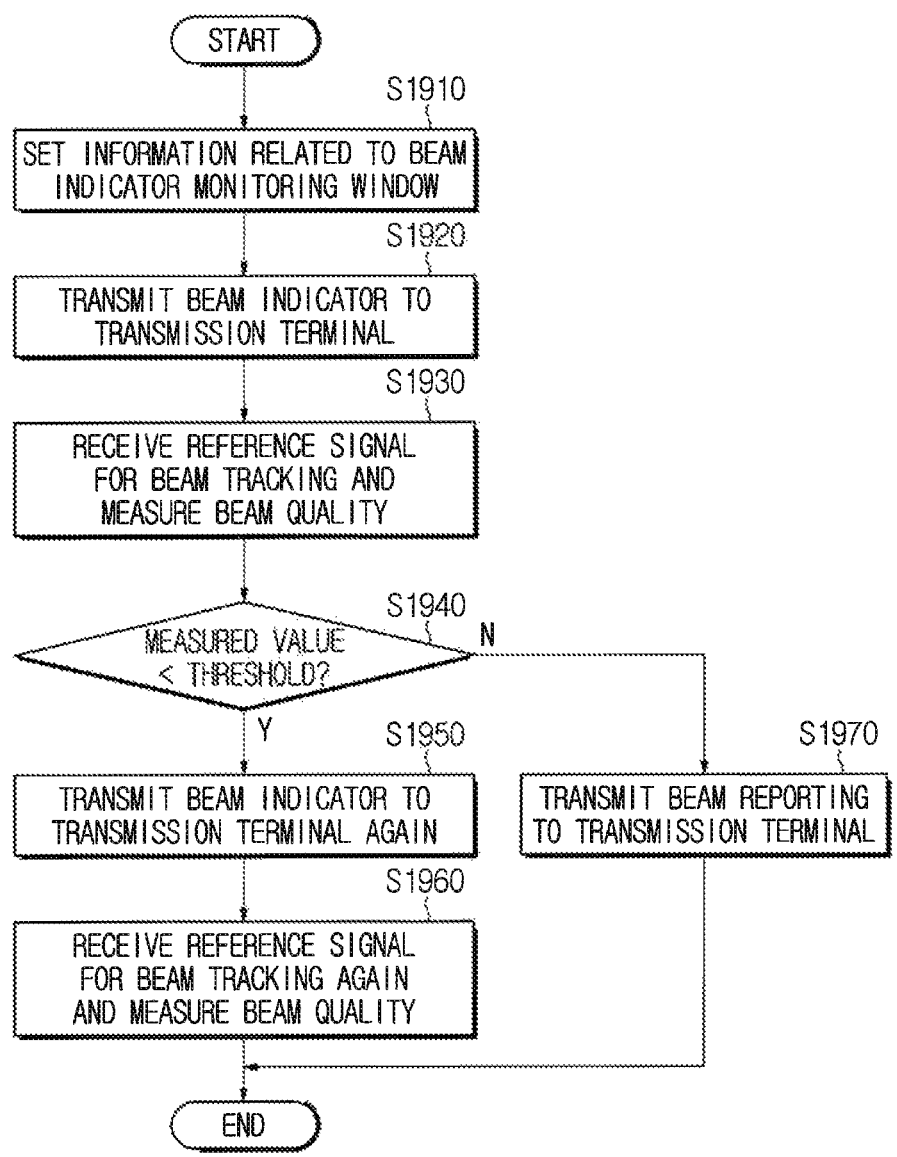
FIG. 19 is a flowchart illustrating a method of performing beam tracking according to an embodiment of the present disclosure.

FIG. 19 is a flowchart illustrating a method of performing beam tracking according to an embodiment of the present disclosure.

Referring to FIG. 19, when a reception terminal and a transmission terminal perform a link connection based on a best beam, the reception terminal and the transmission terminal may set information related to a beam indicator monitoring window (S1910). In this case, the information related to the beam indicator monitoring window may include at least one of information on a beam indication or monitoring window offset, a duration of a beam indication or monitoring window, or a transmission cycle of a beam indication or monitoring window. Thereafter, the reception terminal may measure the quality of the serving beam in a state in which the link connection is performed and transmit a beam indicator indicating a request for a reference signal for beam tracking to the transmission terminal when the quality of the serving beam is less than a threshold (S1920). In this case, the transmission terminal may monitor the beam indicator only for the duration of the beam indicator monitoring window. For example, when the transmission terminal monitors the beam indicator signal in the beam indicator monitoring window, the transmission terminal may set the active beam tracking period at a point in time when the beam indicator is monitored. In this case, the transmission terminal may transmit a reference signal for beam tracking to the reception terminal after a first slot from a point in time when the active beam tracking period is set. For example, the first slot may be the above-described slot A, as described above. Thereafter, the reception terminal may receive the reference signal for beam tracking transmitted by the transmission terminal, and measure beam quality based on the received reference signal for beam tracking (S1930). At this time, when the measurement value of the beam quality is less than the threshold value (S1940), the reception terminal may transmit the beam indicator again to the transmission terminal (S1950). In this case, the above-described active beam tracking period may be extended, and the transmission terminal may transmit the reference signal for beam tracking again after a second slot from a point in time when the beam indicator is received. The reception terminal may receive the reference signal for beam tracking again, measure beam quality based thereon, and perform beam tracking through this (S1960).

On the other hand, when the measurement value of the beam quality is greater than the threshold, the reception terminal may transmit beam reporting to the transmission terminal (S1970), and perform data exchange based thereon, as described above.

System and Various Devices to which Embodiments of the Present Disclosure are Applicable Various embodiments of the present disclosure may be mutually combined.

Hereinafter, an apparatus to which various embodiments of the present disclosure is applicable will be described. Although not limited thereto, various descriptions, functions, procedures, proposals, methods, and/or flowcharts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 20:
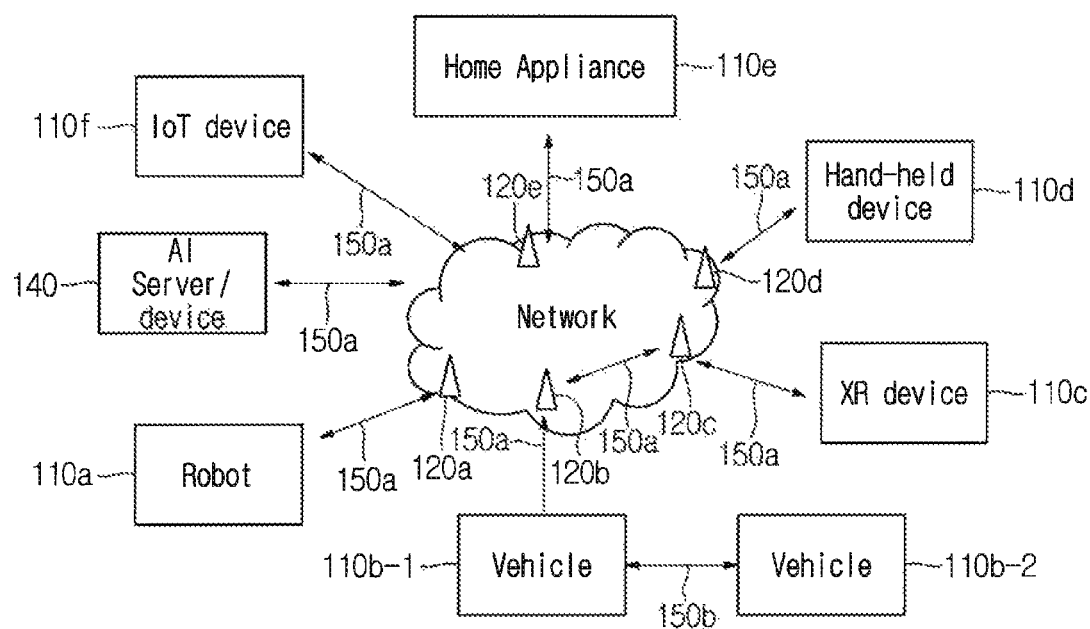
FIG. 20 illustrates a communication system according to an embodiment of the present disclosure.

FIG. 20 illustrates a communication system according to an embodiment of the present disclosure. The embodiment of FIG. 20 may be combined with various embodiments of the present disclosure.

Referring to FIG. 20, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120*a* to 120*e* network may be implemented by a wireless device, and a specific wireless device 120*a* may operate as a base station/network node for another wireless device.

Here, the wireless communication technology implemented in the wireless devices 110*a* to 110*f* of the present specification may include a narrowband Internet of Things for low-power communication as well as LTE, NR, and 6G. At this time, for example, NB-IoT technology may be an example of LPWAN (Low Power Wide Area Network) technology, may be implemented in standards such as LTE Cat NB1 and/or LTE Cat NB2, and is not limited to the above-described names. Additionally or alternatively, the wireless communication technology implemented in the wireless devices 110*a* to 110*f* of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 110*a* to 110*f* of the present specification may include at least one of ZigBee, Bluetooth, and Low Power Wide Area Network (LPWAN) in consideration of low power communication, and is not limited to the above-described names. For example, the ZigBee technology may create PAN (personal area networks) related to small/low-power digital communication based on various standards such as IEEE 802.15.4, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 21:
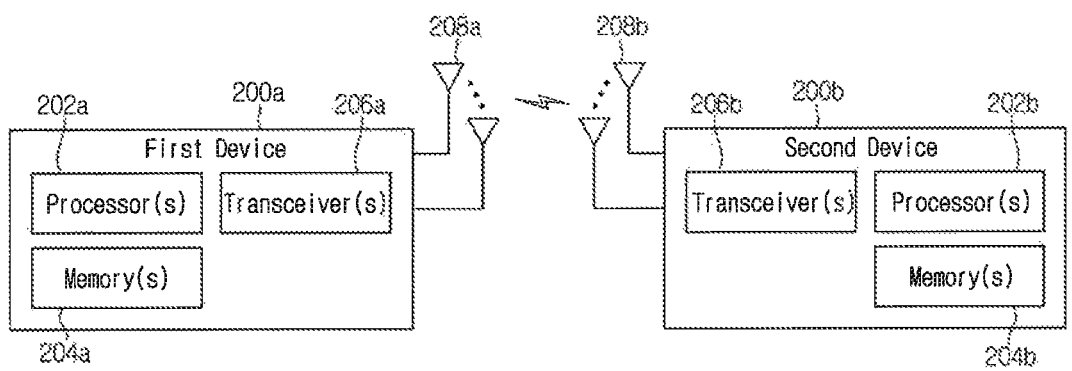
FIG. 21 illustrates a wireless device according to an embodiment of the present disclosure.

FIG. 21 illustrates a wireless device according to an embodiment of the present disclosure. The embodiment of FIG. 21 may be combined with various embodiments of the present disclosure.

Referring to FIG. 21, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of one or more processors 202b, one or more memories 204b, one or more transceivers 206b, and/or one or more antennas 208b may be similar to those of one or more processors 202a, one or more memories 204a, one or more transceivers 206a and/or one or more antennas 208a of the first wireless device 200a.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs), one or more service data unit (SDU), messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. In addition, one or more transceivers 206a and 206b may be coupled with one or more antennas 208a and 208b, and may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 22:
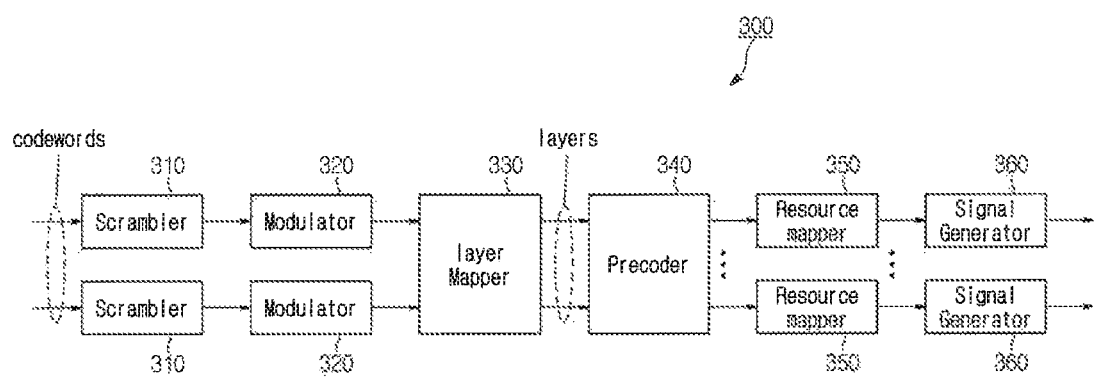
FIG. 22 illustrates a circuit for processing a transmission signal according to an embodiment of the present disclosure.

FIG. 22 illustrates a signal process circuit for a transmission signal applicable to the present disclosure. The embodiment of FIG. 22 may be combined with various embodiments of the present disclosure.

Referring to FIG. 22, a signal processing circuit 300 may include scramblers 310, modulators 320, a layer mapper 330, a precoder 340, resource mappers 350, and signal generators 360. For example, an operation/function of FIG. 22 may be performed by the processors 202a and 202b and/or the transceivers 206a and 206b of FIG. 21. Hardware elements of FIG. 22 may be implemented by the processors 202a and 202b and/or the transceivers 36 and 206 of FIG. 21. For example, blocks 310 to 360 may be implemented by the processors 202a and 202b of FIG. 21. Alternatively, the blocks 310 to 350 may be implemented by the processors 202a and 202b of FIG. 21 and the block 360 may be implemented by the transceivers 206a and 206b of FIG. 21, and it is not limited to the above-described embodiment.

Codewords may be converted into radio signals via the signal processing circuit 300 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH) of FIG. 22. Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 22. For example, the wireless devices (e.g., 200a and 200b of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
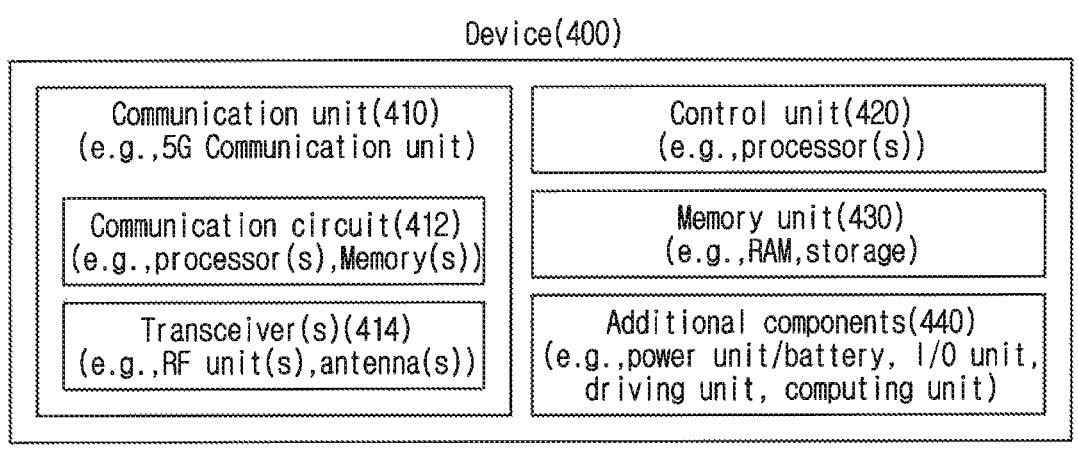
FIG. 23 illustrates another example of a wireless device according to an embodiment of the present disclosure.

FIG. 23 shows another example of a wireless device according to an embodiment of the present disclosure. FIG. 23 may be combined with various embodiments of the present disclosure.

Referring to FIG. 23, a wireless device 300 corresponds to the wireless devices 200a and 200b of FIG. 21, and may include various elements, components, units/portions, and/or modules. For example, the wireless device 400 may include a communication unit 410, a control unit 420, a memory unit 430, and an additional component 440.

The communication unit 410 may include a communication circuit 412 and transceiver(s) 414. The communication unit 410 may transmit and receive signals (e.g., data, control signals, etc.) to and from other wireless devices and base stations. For example, the communication circuit 412 may include one or more processors 202a and 202b and/or one or more memories 204a and 204b of FIG. 21. For example, the transceiver(s) 414 may include one or more transceivers 206a and 206b and/or one or more antennas 208a and 208b of FIG. 21.

The control unit 420 may be composed of a set of one or more processors. For example, the control unit 420 may include a set of a communication control processor, an application processor (AP), an electronic control unit (ECU), a graphic processing processor, a memory control processor, and the like. The control unit 420 is electrically connected to the communication unit 410, the memory unit 430, and the additional component 440, and controls general operations of the wireless device. For example, the controller 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 through a wireless/wired interface, or store, in the memory unit 430, information received from the outside (e.g., another communication device) through the communication unit 410 through a wireless/wired interface.

The memory unit 430 may be composed of a RAM, a DRAM (dynamic RAM), a ROM, a flash memory, a volatile memory, a non-volatile memory and/or a combination thereof. The memory unit 430 may store data/parameters/programs/codes/commands necessary to drive the wireless device 400. Also, the memory unit 430 may store input/output data/information.

The additional component 440 may be variously configured according to the type of the wireless device. For example, the additional component 440 may include at least one of a power unit/battery, an input/output unit, a driving unit, and a computing unit. Although not limited thereto, the wireless device 400 may be implemented in the form of a robot (FIGS. 1, 110a), a vehicle (FIGS. 1, 110b-1 and 110b-2), an XR device (FIGS. 1, 110c), and a mobile device (FIGS. 1, 110d), home appliance (FIGS. 1, 110e), an IoT device (FIGS. 1, 110f), a digital broadcasting terminal, a hologram device, a public safety device, an MTC device, a medical device, a fintech device (or financial device), a security device, a climate/environment device, an AI server/device (FIGS. 1, 140), a base station (FIGS. 1, 120), and a network node. The wireless device may be mobile or used in a fixed location according to the use-example/service.

Figure 24:
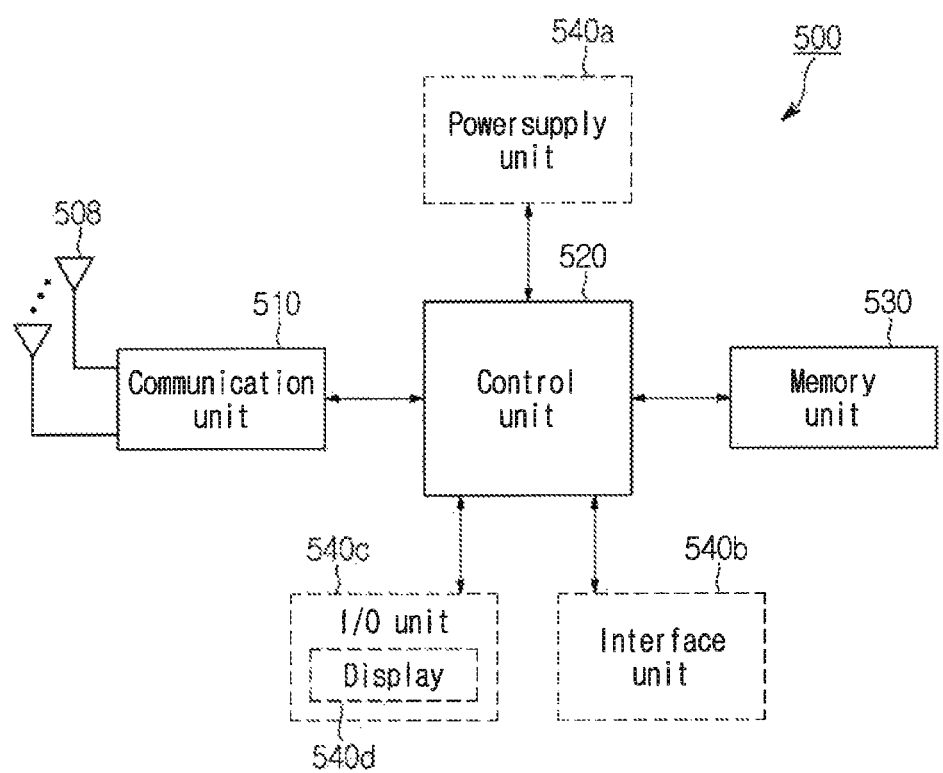
FIG. 24 illustrates a hand-held device according to an embodiment of the present disclosure.

FIG. 24 illustrates a hand-held device applicable to the present disclosure. FIG. 24 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 24 may be combined with various embodiments of the present disclosure.

Referring to FIG. 24, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/440a to 540c may correspond to the blocks 310 to 330/340 of FIG. 35, respectively, and duplicate descriptions are omitted.

The communication unit 510 may transmit and receive signals and the control unit 520 may control the hand-held device 500, and the memory unit 530 may store data and so on. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Figure 25:
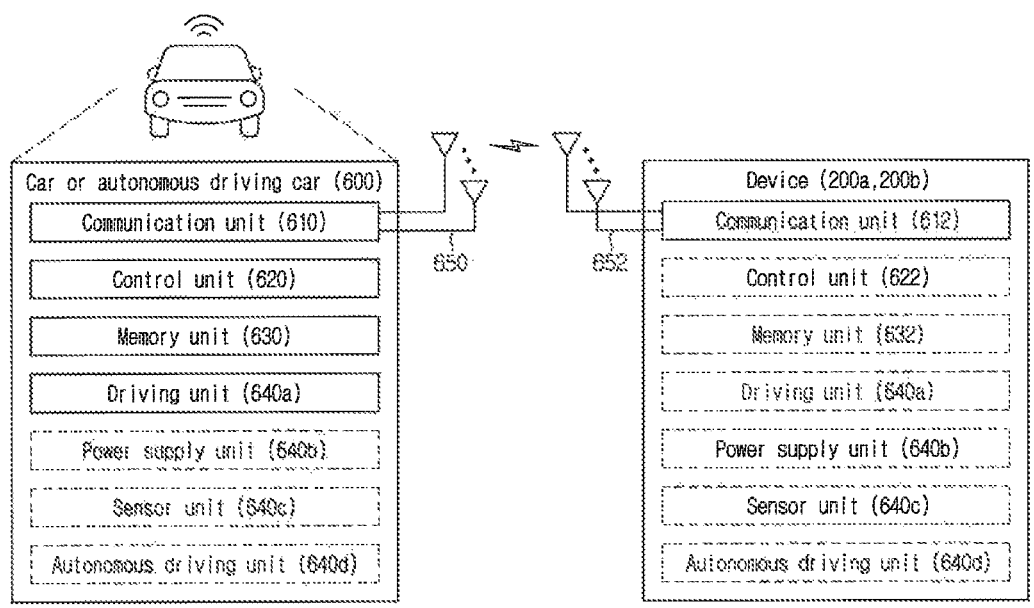
FIG. 25 illustrates a car or an autonomous vehicle according to an embodiment of the present disclosure.

FIG. 25 illustrates a car or an autonomous vehicle applicable to the present disclosure. FIG. 25 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 25 may be combined with various embodiments of the present disclosure.

Referring to FIG. 25, the car or autonomous driving car 600 may include an antenna unit (antenna) 608, a communication unit (transceiver) 610, a control unit (controller) 620, a driving unit 640a, a power supply unit (power supply) 640b, a sensor unit 640c, and an autonomous driving unit 640d. The antenna unit 650 may be configured as part of the communication unit 610. The blocks 610/630/640a to 640d correspond to the blocks 510/530/540 of FIG. 24, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640a may drive the car or autonomous driving car 600 on the ground. The driving unit 640a may include an engine, a motor, a power train, wheels, a brake, a steering device, etc. The power supply unit 640b may supply power to the car or autonomous driving car 600, and include a wired/wireless charging circuit, a battery, etc. The sensor unit 640c may obtain a vehicle state, surrounding environment information, user information, etc. The sensor unit 640c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640d may generate an autonomous driving route and a driving plan based on the acquired data. The control unit 620 may control the driving unit 640a (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640c may acquire a vehicle state and surrounding environment information. The autonomous driving unit 640d may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

For example, operation of a device including at least one memory and at least one processor functionally connected to the at least one memory based on the device of FIGS. 20 to 25 may be considered. In this case, the at least one processor may receive at least one sidelink synchronization signal/broadcast block (S-SSB) from another device, select a best beam based on the at least one S-SSB, transmit a best beam indication signal indicating the selected best beam to the other device, and perform a link connection with the other device based on the best beam. In this case, each of the at least one S-SSB may be associated with each beam index based on a beam direction, each beam index may be associated with each sequence offset, and the best beam indication signal may be generated based on a sequence offset corresponding to the best beam, as described above.

In addition, a non-transitory computer-readable medium storing at least one instruction in the device of FIGS. 20 to 25 may be considered. The computer-readable medium may comprise the at least one instruction executable by a processor. The at least one instruction may enable a device to receive at least one sidelink synchronization signal/broadcast block (S-SSB) from another device, to select a best beam based on the at least one S-SSB, to transmit a best beam indication signal indicating the selected best beam to the other device and to perform a link connection with the other device based on the best beam. In this case, each of the at least one S-SSB may be associated with each beam index based on a beam direction, each beam index may be associated with each sequence offset, and the best beam indication signal may be generated based on a sequence offset corresponding to the best beam, as described above.

Since examples of the above-described proposed method may also be included as one of the implementation methods of the present disclosure, it is clear that they may be regarded as a kind of proposed method. In addition, the above-described proposed methods may be implemented independently, or may be implemented in the form of a combination (or merge) of some of the proposed methods. The rule may be defined so that a base station notifies a terminal of the information on whether the proposed methods are applied (or information on the rules of the proposed methods) through a predefined signal (e.g., a physical layer signal or a higher layer signal).

The present disclosure may be embodied in other specific forms without departing from the technical ideas and essential characteristics described in the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure. In addition, claims that are not explicitly cited in the claims may be combined to form an embodiment or may be included as a new claim by amendment after the application is filed.

What is claimed is:

1. A method of operating a reception user equipment (UE) in a wireless communication system, the method comprising:
   receiving at least one sidelink synchronization signal/broadcast block (S-SSB) from a transmission UE, wherein the at least one S-SSB includes primary sidelink synchronization signal (PSSS) and secondary sidelink synchronization signal (SSSS);
   selecting an S-SSB among the at least one S-SSB;
   transmitting an S-SSB indication signal indicating the selected S-SSB to the transmission UE;
   performing a link connection with the transmission UE based on the selected S-SSB; and
   determining one or more resource pools, wherein the one or more resource pools are configured by a base station based on that sidelink resource allocation mode 1, or the one or more resource pools are determined by a first terminal based on that sidelink resource allocation mode 2, wherein a resource pool includes a plurality of contiguous frequency resources in a frequency domain, and a set of slots in a time domain,
   wherein each of the at least one S-SSB is associated with each index and each index is associated with each sequence offset, and
   wherein the S-SSB indication signal is generated based on a sequence offset associated with an index corresponding to the selected S-SSB.

2. The method of claim 1, wherein the selected S-SSB is associated with a best beam, and an index of the selected S-SSB is associated with a beam direction, and
   wherein the reception UE performs measurement on the at least one S-SSB and selects the best beam based on the measurement.

3. The method of claim 2, wherein the measurement is performed based on at least one of a signal to interference plus noise ratio (SINR), received signal received power (RSRP) or reference signal received quality (RSRQ).

4. The method of claim 2, wherein the at least one S-SSB is sequentially transmitted based on a predetermined cycle in a predetermined period.

5. The method of claim 4, wherein an S-SSB first transmitted among the at least one S-SSB in the predetermined period is transmitted at a position spaced apart by an offset from a start point of the predetermined period.

6. The method of claim 5, wherein information on the predetermined period, information on the predetermined cycle and information on the offset is scheduled by a base station.

7. The method of claim 5, wherein a beam index of the at least one S-SSB transmitted in the predetermined period is sequentially set based on a transmission order.

8. The method of claim 2, wherein, the reception UE and the transmission UE set information related to a beam indicator monitoring window based on that the reception UE and the transmission UE perform the link connection based on the best beam.

9. The method of claim 8, wherein the information related to the beam indicator monitoring window comprises at least one of information on an offset of a beam indication or monitoring window, a duration of a beam indication or monitoring window or a transmission cycle of a beam indication or monitoring window.

10. The method of claim 9,
wherein the reception UE measures quality of a serving beam in a state in which the link connection is performed and transmits a beam indicator for a request of a reference signal for beam tracking to the transmission UE when quality of the serving beam is less than a threshold, and
wherein the transmission UE monitors the beam indicator only during the duration of the beam indicator monitoring window.

11. The method of claim 10, wherein the transmission UE sets an active beam tracking period at a point in time when the beam indicator is monitored in the duration of the beam indicator monitoring window and transmits the reference signal for beam tracking to the reception UE after a first slot from a point in time when the active beam tracking period is set.

12. The method of claim 11,
wherein the reception UE receives the reference signal for beam tracking transmitted by the transmission UE, measures beam quality based on the received reference signal for beam tracking, and performs beam reporting to the transmission UE when a measurement value of the beam quality is greater than the threshold, and
wherein, when the measurement value of the beam quality is less than the threshold, the beam indicator is transmitted to the transmission UE again.

13. The method of claim 12, wherein the beam reporting or the beam indicator is received after a second slot from a point in time when the transmission UE transmits the reference signal for beam tracking.

14. The method of claim 12, wherein, when the transmission UE receives the beam reporting, the active beam tracking period ends.

15. The method of claim 12, wherein, when the transmission UE receives the beam indicator again, the active beam tracking period is extended and the reference signal for beam tracking is transmitted again after the first slot from a point in time when the beam indicator is received.

16. A reception user equipment (UE) in a wireless communication system, the reception UE comprising:
a transceiver; and
a processor connected to the transceiver,
wherein the processor is configured to:
receive at least one sidelink synchronization signal/broadcast block (S-SSB) from a transmission UE, wherein the at least one S-SSB includes primary sidelink synchronization signal (PSSS) and secondary sidelink synchronization signal (SSSS),
select an S-SSB among the at least one S-SSB,
transmit an S-SSB indication signal indicating the selected S-SSB to the transmission UE,
perform a link connection with the transmission UE based on the selected S-SSB, and
determine one or more resource pools, wherein the one or more resource pools are configured by a base station based on that sidelink resource allocation mode 1, or the one or more resource pools are determined by a first terminal based on that sidelink resource allocation mode 2, wherein a resource pool includes a plurality of contiguous frequency resources in a frequency domain, and a set of slots in a time domain,
wherein each of the at least one S-SSB is associated with each index and each index is associated with each sequence offset, and
wherein the S-SSB indication signal is generated based on a sequence offset associated with an index corresponding to the selected S-SSB.

17. A transmission user equipment (UE) in a wireless communication system, the transmission UE comprising:
a transceiver; and
a processor connected to the transceiver,
wherein the processor is configured to:
transmit at least one sidelink synchronization signal/broadcast block (S-SSB) to a reception UE;
receive an S-SSB indication signal indicating a selected S-SSB from the reception UE, wherein the at least one S-SSB includes primary sidelink synchronization signal (PSSS) and secondary sidelink synchronization signal (SSSS),
perform a link connection with the reception UE based on the selected S-SSB, and
determine one or more resource pools, wherein the one or more resource pools are configured by a base station based on that sidelink resource allocation mode 1, or the one or more resource pools are determined by a first terminal based on that sidelink resource allocation mode 2, wherein a resource pool includes a plurality of contiguous frequency resources in a frequency domain, and a set of slots in a time domain,
wherein each of the at least one S-SSB is associated with each index and each index is associated with each sequence offset, and
wherein the S-SSB indication signal is generated based on a sequence offset associated with an index corresponding to the selected S-SSB.

* * * * *